United States Patent
Okuno

(10) Patent No.: US 8,135,004 B2
(45) Date of Patent: Mar. 13, 2012

(54) MULTI-PLANE CELL SWITCH FABRIC SYSTEM

(75) Inventor: Michitaka Okuno, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 80 days.

(21) Appl. No.: 12/010,703

(22) Filed: Jan. 29, 2008

(65) Prior Publication Data
US 2008/0279195 A1 Nov. 13, 2008

(30) Foreign Application Priority Data
May 7, 2007 (JP) ................................ 2007-122014

(51) Int. Cl.
*H04L 12/50* (2006.01)
*H04Q 11/00* (2006.01)

(52) U.S. Cl. ........ 370/388; 370/360; 370/363; 370/367; 370/368; 370/389; 370/392

(58) Field of Classification Search ........... 370/360, 370/363, 367, 368, 386, 388, 389, 392, 394, 370/395.1, 395.71, 400, 412, 429; 710/29, 710/30, 36, 52, 16
See application file for complete search history.

(56) References Cited

U.S. PATENT DOCUMENTS

| | | | | |
|---|---|---|---|---|
| 5,127,000 A * | 6/1992 | Henrion | ......................... | 370/394 |
| 5,210,744 A * | 5/1993 | Yamanaka et al. | ............. | 370/413 |
| 5,383,182 A * | 1/1995 | Therasse et al. | ............... | 370/394 |
| 5,537,403 A * | 7/1996 | Cloonan et al. | ................ | 370/352 |
| 5,550,978 A * | 8/1996 | Takahashi et al. | ............ | 709/236 |
| 5,631,908 A * | 5/1997 | Saxe | .............................. | 370/235 |
| 5,923,644 A * | 7/1999 | McKeown et al. | ............ | 370/230 |
| 6,330,222 B1 * | 12/2001 | Ebisawa | ......................... | 370/230 |
| 6,473,428 B1 * | 10/2002 | Nichols et al. | ............. | 370/395.1 |
| 6,667,984 B1 * | 12/2003 | Chao et al. | ..................... | 370/414 |
| 6,832,261 B1 * | 12/2004 | Westbrook et al. | ........... | 709/236 |
| 6,931,009 B1 * | 8/2005 | Agarwal | ..................... | 370/395.1 |
| 6,947,380 B1 * | 9/2005 | Yip et al. | ....................... | 370/230 |

(Continued)

FOREIGN PATENT DOCUMENTS
WO     WO 02/43329 A1     11/2001

*Primary Examiner* — Aung S Moe
*Assistant Examiner* — Benjamin H Elliott, IV
(74) *Attorney, Agent, or Firm* — Stites & Harbison, PLLC; Juan Carlos A. Marquez, Esq

(57) ABSTRACT

Disclosed herewith is a multi-plane cell switch fabric system in which each switching unit functions asynchronously with others. The system executes distribution/restoration operations without lowering the switching capacity to reorder cells that arrive in random order from a plurality of switches just as they were in original flows and packets respectively with a small hardware capacity. In the system, the distribution unit divides each variable length packet addressed to the same destination into fixed length cells and sends those divided cells by a unit of integer multiple of the number of switches. On the other hand, the reordering unit, while holding cells that arrive in random order from each switching unit (switching units 1 to M) in a receive buffer, separates only the header information from each cell and holds the header information in a retry queue. The reordering unit, upon finding the header information of a head cell of a flow in an ordering check at the time of receiving or in a retry check in the retry queue, extracts the corresponding cell bodies from the receive buffer to restore the original order of those cells in the subject packet.

10 Claims, 17 Drawing Sheets

U.S. PATENT DOCUMENTS

| | | | |
|---|---|---|---|
| 6,985,486 B1* | 1/2006 | Agrawal | 370/395.1 |
| 7,023,840 B2* | 4/2006 | Golla et al. | 370/360 |
| 7,046,687 B1* | 5/2006 | Brown et al. | 370/412 |
| 7,095,744 B2* | 8/2006 | Iny | 370/395.6 |
| 7,126,959 B2* | 10/2006 | Van Asten et al. | 370/429 |
| 7,505,458 B2* | 3/2009 | Menon et al. | 370/389 |
| 7,539,143 B2* | 5/2009 | Moores et al. | 370/235.1 |
| 7,639,679 B2* | 12/2009 | Noirie et al. | 370/388 |
| 2002/0061030 A1* | 5/2002 | Iny | 370/449 |
| 2003/0123468 A1* | 7/2003 | Nong | 370/412 |
| 2003/0128712 A1* | 7/2003 | Moriwaki et al. | 370/412 |
| 2003/0231588 A1* | 12/2003 | Roth et al. | 370/230 |
| 2004/0141510 A1* | 7/2004 | Blanc et al. | 370/401 |
| 2004/0143593 A1* | 7/2004 | Le Maut et al. | 707/102 |
| 2005/0002334 A1* | 1/2005 | Chao et al. | 370/230 |
| 2005/0073956 A1* | 4/2005 | Moores et al. | 370/235 |
| 2005/0201400 A1* | 9/2005 | Park et al. | 370/412 |
| 2007/0115957 A1* | 5/2007 | Noirie et al. | 370/386 |
| 2008/0008204 A1* | 1/2008 | Yamada et al. | 370/412 |
| 2008/0089353 A1* | 4/2008 | Dunets et al. | 370/415 |
| 2008/0107053 A1* | 5/2008 | Kim et al. | 370/310 |
| 2008/0279195 A1* | 11/2008 | Okuno | 370/395.6 |

* cited by examiner

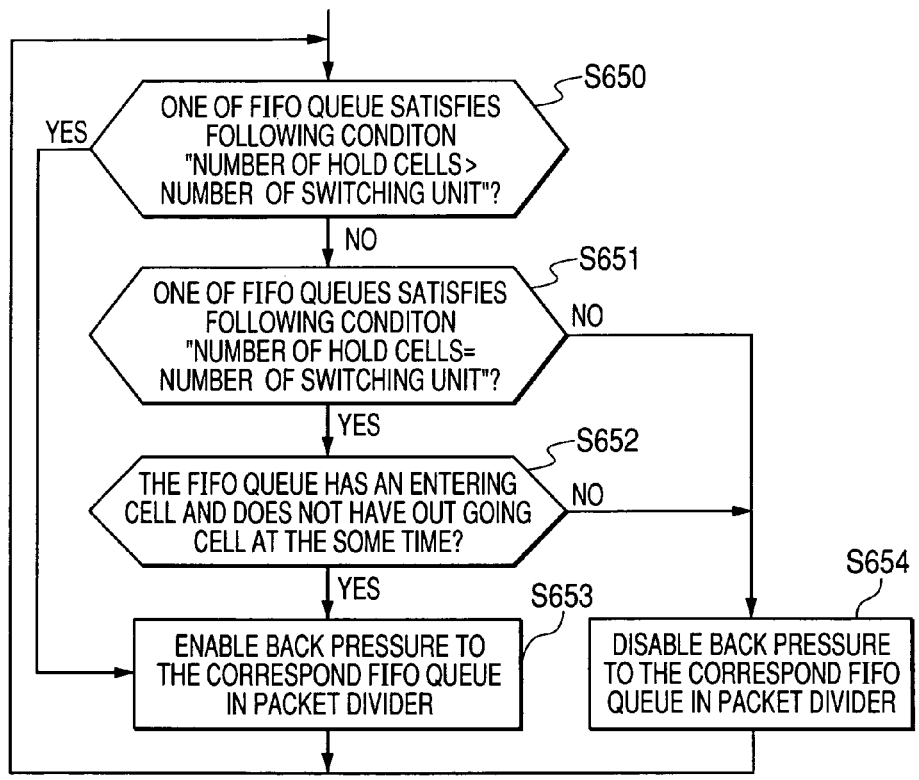

FIG. 11

| Credit Table for Destination 1 | | Credit Table for Destination 2 | | Credit Table for Destination 3 | | Credit Table for Destination 4 | | |
|---|---|---|---|---|---|---|---|---|
| CREDIT FOR SOURCE 1 | 1 | CREDIT FOR SOURCE 1 | 1 | CREDIT FOR SOURCE 1 | 1 | CREDIT FOR SOURCE 1 | 1 | }221 |
| CREDIT FOR SOURCE 2 | 1 | CREDIT FOR SOURCE 2 | 1 | CREDIT FOR SOURCE 2 | 1 | CREDIT FOR SOURCE 2 | 1 | |
| CREDIT FOR SOURCE 3 | 1 | CREDIT FOR SOURCE 3 | 1 | CREDIT FOR SOURCE 3 | 1 | CREDIT FOR SOURCE 3 | 1 | |
| CREDIT FOR SOURCE 4 | 1 | CREDIT FOR SOURCE 4 | 1 | CREDIT FOR SOURCE 4 | 1 | CREDIT FOR SOURCE 4 | 1 | |
| COMMON CREDIT FOR ALL SOURCES | 8 | COMMON CREDIT FOR ALL SOURCES | 8 | COMMON CREDIT FOR ALL SOURCES | 8 | COMMON CREDIT FOR ALL SOURCES | 8 | }222 |

220

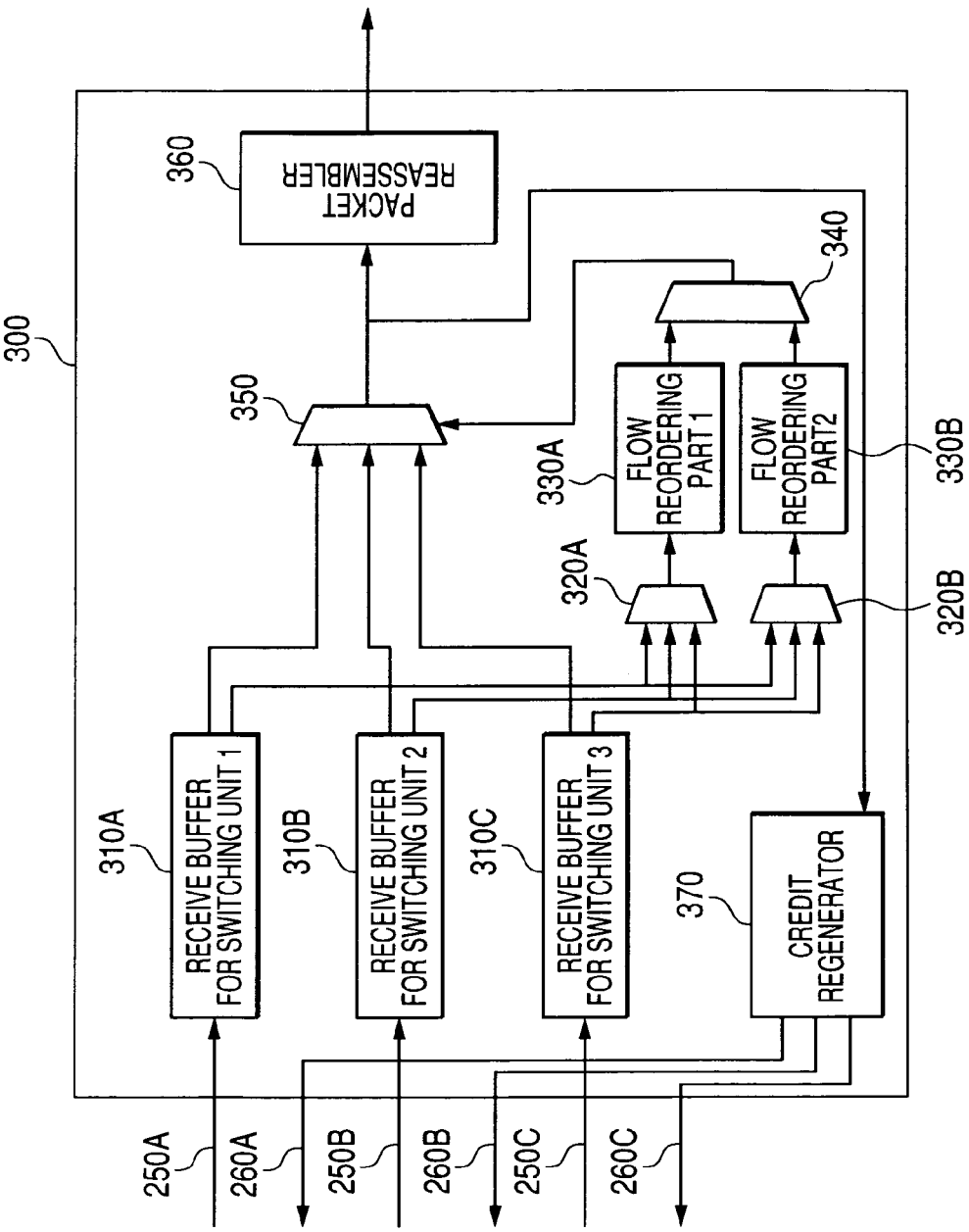

MULTI-PLANE CELL SWITCH FABRIC SYSTEM

CLAIM OF PRIORITY

The present application claims priority from Japanese application JP 2007-122014 field on May 7, 2007, the content of which is hereby incorporated by reference into this application.

FIELD OF THE INVENTION

The present invention relates to a switching technique for connecting a plurality of functional blocks provided in such an apparatus as a router, a server, a storage, etc. dynamically to each another, more particularly to a technique for utilizing a plurality of independently functioning switches to sort data into their original order if they do not arrive at their destination in order of their original sequential numbers.

BACKGROUND OF THE INVENTION

In a network transfer apparatus such as a router, in a server, and in a storage unit for connecting a plurality of disk arrays, a switch fabric for switching data among the functional blocks in itself is used. The switching capacity of such a switch fabric is represented with a product of the number of ports and the port capacity (line speed). And to realize a large switching capacity, either of the number of ports or the port capacity or both of them must be increased.

And in order to increase the number of ports, element switches are connected in multiple steps to form an omega network, cross network, fat tree network, or the like. Furthermore, the port capacity of a switch LSI (Large Scale Integration) can also be increased to increase the port capacity. However, in this case, the number of connectable pins on such an LSI is limited by the mounting capacity of the CMOS (Complementary MOS) in that age. If a large capacity port is realized, therefore, the number of ports per switch LSI decreases.

Although it is possible here to improve the total switching capacity of a switch fabric by connecting a plurality of switch LSIs having a few large capacity ports in multiple steps, the number of connecting steps increases in proportion to the increase of the number of ports, thereby the latency passing through the switch fabric increases and the throughput of the switch fabric is lowered due to the conflicts that occur between cells therein even when their destinations are different. Those have been problems. And a multi-plane switch (parallel packet switch) is known well as one of the methods for avoiding such problems and realizing a large capacity as described above.

In case of such a multi-plane cell switch, a plurality of comparatively low speed switch LSIs ("M" LSIs) provided with a port having a 1/M of the required capacity respectively are prepared and each input data is divided so as to be distributed to the switches at its distribution part that functions as an input of the switch fabric, then passed through those switches in a dispersed manner to realize a desired large switching capacity. Generally, in case of a switch used in a network apparatus, input data is variable length packets and each packet is divided into fixed length cells.

In case of a most simply configured multi-plane cell switch, it is required to synchronize a plurality of switch LSIs used for its switching units and furthermore to make arbitrations perfectly among cells addressed to the same destination. Consequently, cells come to arrive at the destination in the preset order at a predictable timing respectively. This is why packets can be restored easily and the order of those packets in each flow is also restored easily.

In recent years, however, the port capacity and the switching capacity required for switches are expanded significantly and the speed of each switch LSI itself used for such multi-plane switches is improved. For example, high speed serial transmission referred to as SerDes (SERialization/DE-Serialization) is employed for the communications between LSIs and cells' switching pitch is also shortened. It is thus impossible actually to synchronize those switches with each another completely. This is why there have been demanded a multi-plane cell switch in which each switch functions asynchronously with others, that is, makes destination arbitration independently.

In case of such a multi-plane cell switch in which each switching unit functions asynchronously with others, it is not assured that the sending order and the arriving order match between the distribution unit that functions as an input of the switch fabric and the reordering unit that functions as an output of the switch fabric. Therefore, cells in a packet (flow) sent from the same source to the same destination must be reordered just as they were before so as to restore the original packet (flow) respectively (packet restoration).

The document US2004/0143593 (A1) discloses a method for restoring an original order of packets by storing those packets until they are collected enough for forming their flow at the destination with use of the sequence number, source number, routing index (a value for referring to a single destination or a combination of a plurality of destinations respectively), and priority level of each packet. The method disclosed in this document, however, is expected to require a mechanism for holding packets enough for forming the number of flows represented with a product of the source number, routing index, and priority level respectively, thereby resulting in an increase of the number of hardware items. This has been a problem.

On the other hand, the document WO02/43329 (A1) discloses a method for restoring an original order of cells/packets in an first-in first-out order of the time stamps in each flow at the subject switch destination by assigning the destination number, source number, cell division number, as well as the same time stamp to each cell generated from the same packet, then by selecting older time stamps preferentially in the switch with use of a common watch among the units of the switch fabric. However, the method disclosed in this document is also expected to require a mechanism for holding packets enough for forming the number of flows represented with a product of the source number and the routing index respectively, thereby resulting in an increase of the hardware items. This has been a problem. Furthermore, the method for using a watch commonly among the units of the switch fabric to sort cells/packets in accordance with the watch time is becoming difficult more and more as the transfer speed of packets and cells is improved. This has also been a problem.

The document U.S. Pat. No. 6,832,261 (B1) also discloses a method for restoring an order of cells/packets through communications among a plurality of prepared packet reordering devices. As shown in an embodiment of the U.S. Pat. No. 6,832,261 (B1), the method is also expected to require a mechanism for holding packets enough for forming the number of flows represented with a product of the sequence number and the destination slot (destination numbers) respectively, resulting in an increase of the hardware items. And this has been a problem.

Each of the documents US2004/0143593 (A1) and WO02/43329 (A1) discloses operations of distribution executed by a distribution unit that functions as an input of the switch fabric while keeping the load balance in accordance with the load of each switch, although the document U.S. Pat. No. 6,832,261 (B1) does not describe anything about it clearly, since it aims mainly at the processings of the reordering unit that functions an output of the switch fabric. Generally, however, upon executing a simple load balancing operation, before cells and packets accumulated in a congested switch arrive at their destination, that is, a reordering unit that functions as an output of the switch fabric, subsequent cells and packets might be passed through another non-congested switch to arrive in their destination. And in order to avoid such a problem, the reordering unit is required to hold a mass of cells and packets to restore an original order of those cells and packets, thereby resulting in an increase of the hardware items. This has been a problem.

As described above, in any of conventional multi-plane cell switches in which each switching unit functions asynchronously with others respectively, the original order of flows/packets is restored in the reordering unit, but the method has been confronted with a problem that the method has caused its hardware quantity to increase. And those multi-plane cell switches have been intended originally to improve the switching capacity of the entire switch, so that it is conceivable that the hardware items are mounted sufficiently to prevent lowering of the switching capacity that might otherwise be caused by the distributing and restoring processings of the switch itself. And in order to suppress the manufacturing cost of the apparatus, it is desirable that such a multi-plane cell switch is provided with a reordering unit that can be realized with hardware in a smaller scale.

[Patent document 1] US2004/0143593 (A1)
[Patent document 2] WO02/43329 (A1)
[Patent document 3] U.S. Pat. No. 6,832,261 (B1)

SUMMARY OF THE INVENTION

In case of each multi-plane cell switch in which each switching unit functions asynchronously with others, the switch has been confronted with a problem of how to prevent lowering of the switching capacity that might otherwise be caused by distributing and restoring processings of the switch itself. Furthermore, the switch has also been confronted with another problem of how to realize a method for restoring the original order of cells that arrive in random order from a plurality of switches in each flow/packet.

At first, more than one variable length data addressed to the same destination are divided into fixed length data at an input part of a subject switch fabric. Then, the divided fixed length data are sent by a unit of integer multiple of the number of object switches and each switching unit of the switch fabric arbitrates the data output for each destination by a unit of fixed length data while keeping the order of the fixed length data received from the same source. The output part of the switch fabric distinguishes among flows according to the source numbers and flow numbers of those fixed length data while holding the data in a receive buffer. The output part then compares the current head number with the sequence number of each fixed length data and regards the data as a head of the flow if the numbers are the same. If the numbers are not the same, the output unit holds the data temporarily and checks the sequence number of the subsequent fixed length data. After this, the output unit repeats such checks of the sequence numbers of the fixed length data held temporarily and finally regards the data having the same sequence number with the current head number as a head of the flow. The fixed length data regarded as a head of the flow is then subjected to detection of the packet head and packet tail among those having the same source and flow numbers, thereby restoring the original packet.

Applying the present invention to a multi-plane cell switch in which each switch functions asynchronously with others will thus realize distributing and restoring processings that do not lower the switching capacity. Furthermore, this will make it possible to realize a method for restoring the original order of cells arriving in random order from a plurality of switches in each flow/packet with hardware in a smaller scale. Consequently, the present invention can compose a multi-plane cell switch having a high switching capacity with a cost lower than any of the conventional methods.

BRIEF DESCRIPTION OF THE DRAWINGS

FIG. 8 is a flowchart of a method for generating a back pressure signal from the cell dispatcher and to be sent to the packet divider in the embodiment of the present invention;

FIG. 9 is a diagram for describing credits of a switching unit managed by a distribution unit of the present invention;

FIG. 11 is a diagram for describing credits of a reordering unit managed by the switching unit of the present invention;

FIG. 12 is a block diagram of the-reordering unit in the embodiment of the present invention;

DETAILED DESCRIPTION OF THE PREFERRED EMBODIMENTS

Hereunder, the preferred embodiments of the present invention will be described with reference to the accompanying drawings.

First Embodiment

Figure 1:
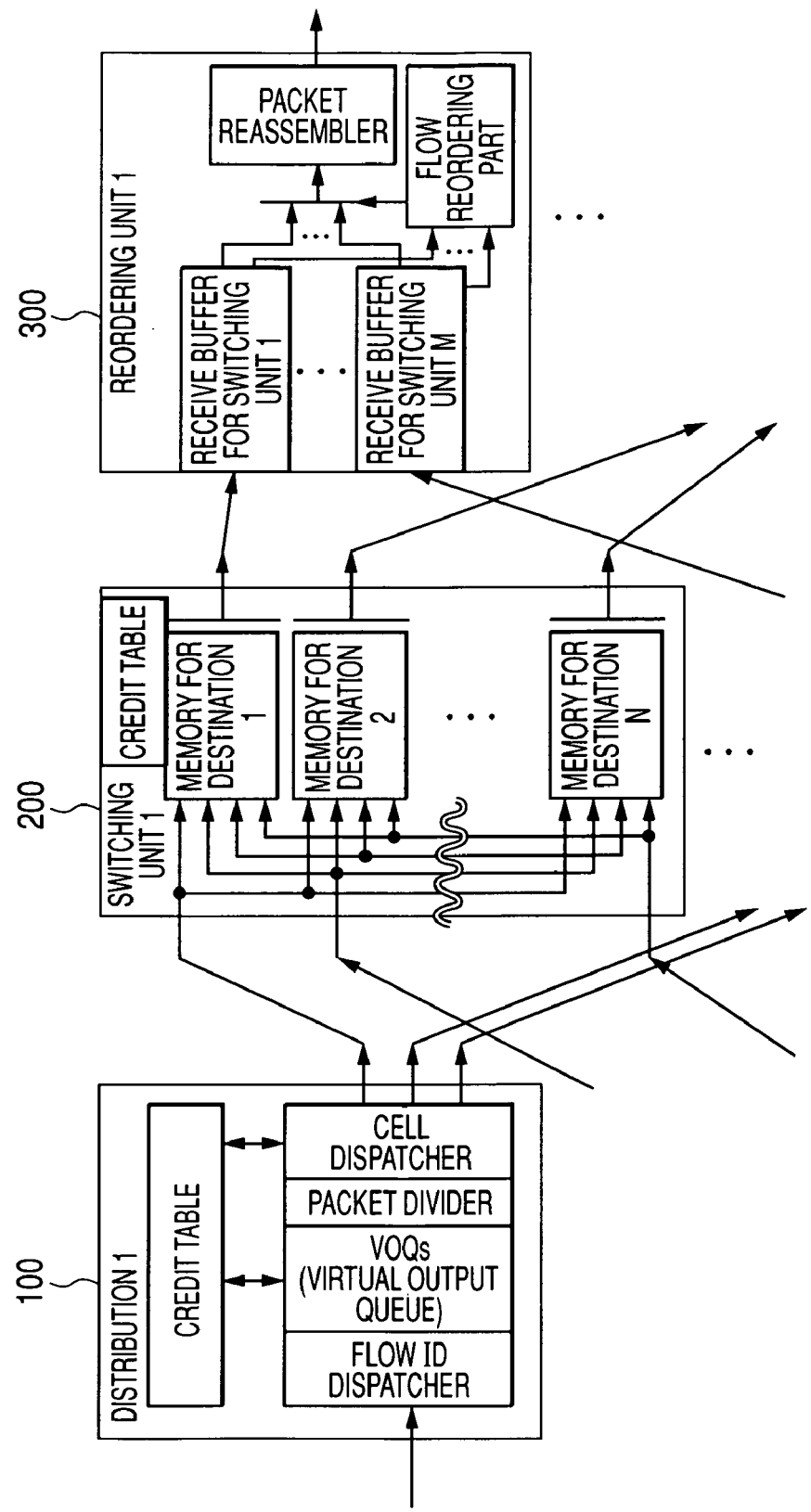
FIG. 1 is a block diagram for showing part of a multi-plane cell switch in an embodiment of the present invention.
Figure 2:
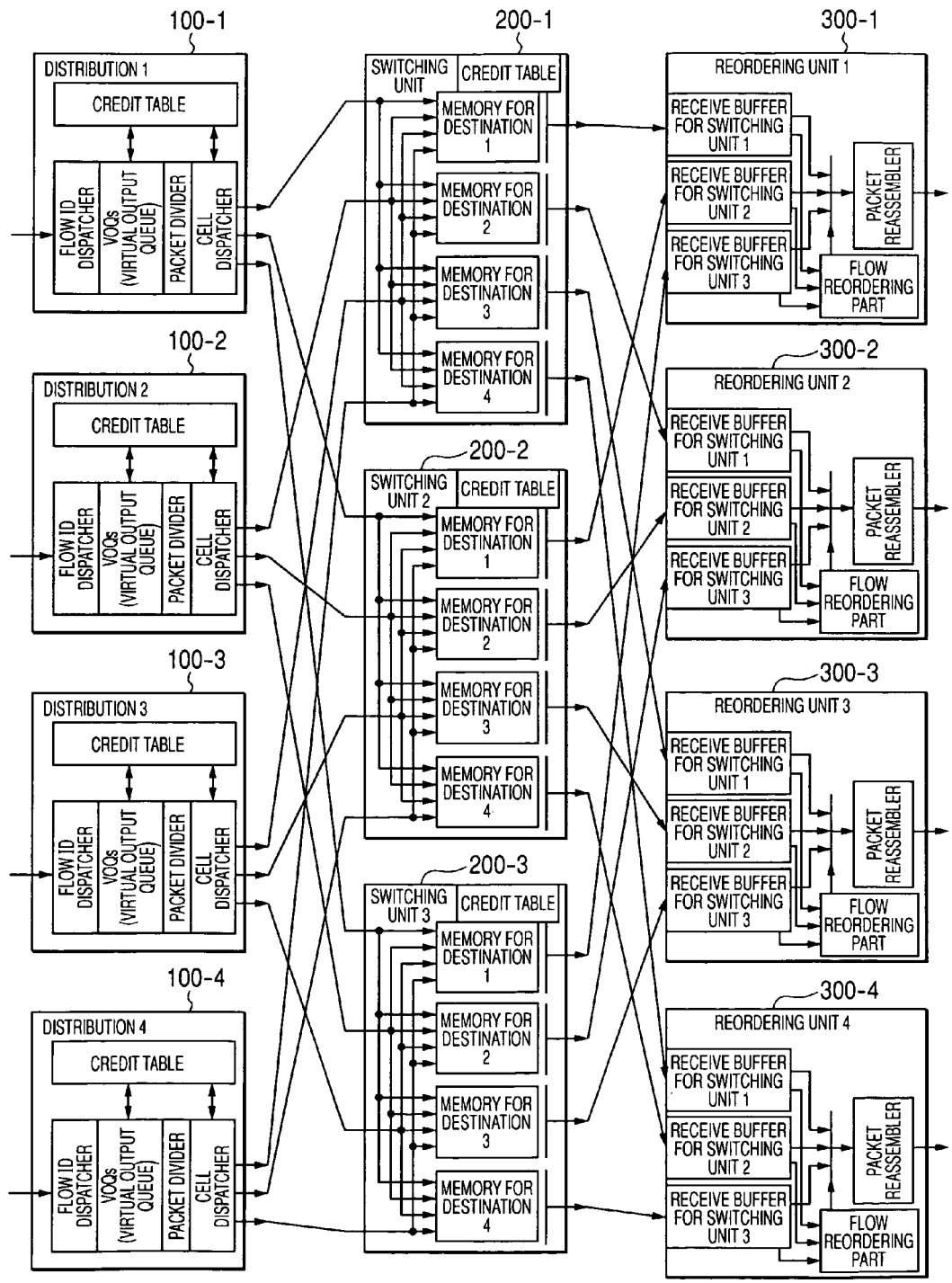
FIG. 2 is another block diagram for showing the multi-plane cell switch in the embodiment of the present invention.

FIG. 1 shows a configuration of a multi-plane cell switch fabric system in an embodiment of the present invention. The multi-plane cell switch fabric system includes "N" distribution units 100, each of which functions as an input, "M" switching units 200 used for switching data respectively, and "N" reordering units 300, each of which functions as an output. Note that, however, FIG. 1 shows only part of the multi-plane cell switch fabric system so as to simplify the configuration; the number of input/output units, as well as the number of switching units can be decided freely. For example, FIG. 2 shows another configuration of the entire multi-plane cell switch fabric system that includes 4 input/output units and 3 switching units. In other words, the multi-plane cell switch fabric system is composed of 4 distribution units 100-[1 to 4], 3 switching units 200-[1 to 3], and 4 reordering units 300-[1 to 4].

At first, how each unit of the switch fabric system will function will be described briefly. Each distribution unit 100 divides each received variable length packet into fixed length cells and sends those cells to a plurality of switching units 200. Each reordering unit 300 at the subject destination restores the original order of those received cells in each packet, then outputs the packet. In FIG. 2, the switching units 200-[1 to 3] function independently of each another. In other words, those switching units 200-[1 to 3] make destination arbitration for inputted cells independently of each other, so that the entire switch fabric system comes to function as an asynchronous multi-plane switch.

In the multi-plane switch fabric system in which each switch functions asynchronously with others, the following two points must be satisfied. This is to realize a method for restoring the original order of cells arriving in random order from a plurality of switches in each flow/packet with a small scale of hardware and memory while realizing both distributing and restoring operations capable of preventing lowering of the switching capacity respectively.

The first point is to utilize the switching band of the subject switch fabric system completely, that is, to enable each distribution unit to distribute the same number of cells to each switching unit and each reordering unit to receive the same number of cells from each switching unit. The second point is to reduce the number of cells to be received in random order by each reordering unit as less as possible.

In a general multi-plane switch fabric system in which each switch handles packets and functions asynchronously with others, if variable length packets are distributed to each switching unit 200 as are, the switching unit 200 that sends a long packet is to be loaded heavily and the switching unit 200 that sends a short packet is to be less loaded. To ease such unbalanced loading in the general multi-plane switch fabric system as described above, variable length packets are divided into fixed length cells respectively and sent one by one to each switching unit 200 in due order. And each switching unit 200 handles the fixed lengths cells.

However, sending cells one by one to each switching unit 200 simply might not be sufficient to prevent a problem that cells sent from a distribution unit 100 to a reordering unit 300 might come to pass through only a specific switching unit 200. For example, in the multi-plane cell switch shown in FIG. 2, if only one cell is generated from a short packet and each packet inputted to every distribution unit 100 is addressed repetitively to destinations 1, 2, 3, 1, 2, 3, 1, 2, 3, the cells addressed to the destination 1 will just pass through the switching unit 200-1, the cells addressed to the destination 2 will just pass through the switching unit 200-2, and the cells addressed to the destination 3 will just pass through the switching unit 200-3 even while each distribution unit 100 sends cells to every switching unit 200 in due order. This gives the reordering unit 300-1 the look of arrivals of cells only from the switching unit 200-1 while those cells are sent from each of the distribution units 100-1 to 100-4.

And the above situation gives each distribution unit 100 the look of rising of the load in a specific switching unit 200 with respect to a destination. And in order to eliminate such unbalanced loading among all the switching units 200, it is required that the cells generated from subsequent packets are sent to each reordering unit 300 through another switching unit 200 that is less loaded. Such a load balancing operation is one of well-known processings for eliminating such unbalanced loading generally.

Once a load balancing operation begins, while cells sent out from a destination in an early stage are staying in a switching unit 200, subsequent cells might arrive in the object reordering unit 300 through another switching unit 200 earlier than the former ones. And this might disturb the arriving order of cells significantly in each reordering unit 300. As described above in the background art, when the arriving order of cells is disturbed significantly in each reordering unit 300 such way, each reordering unit 300 is required to hold a mass of cells and packets so as to restore the original orders of those cells and packets. As a result, the hardware comes to increase in scale unavoidably. This has been a problem.

And in order to avoid such a problem, the present invention enables cells addressed to the same destination to be sent to every switching unit 200 as evenly as possible, thereby realizing utilization of every switching unit evenly and realizing receiving of cells evenly from every source 100 of every reordering unit 300 through every switching unit 200.

Figure 3:
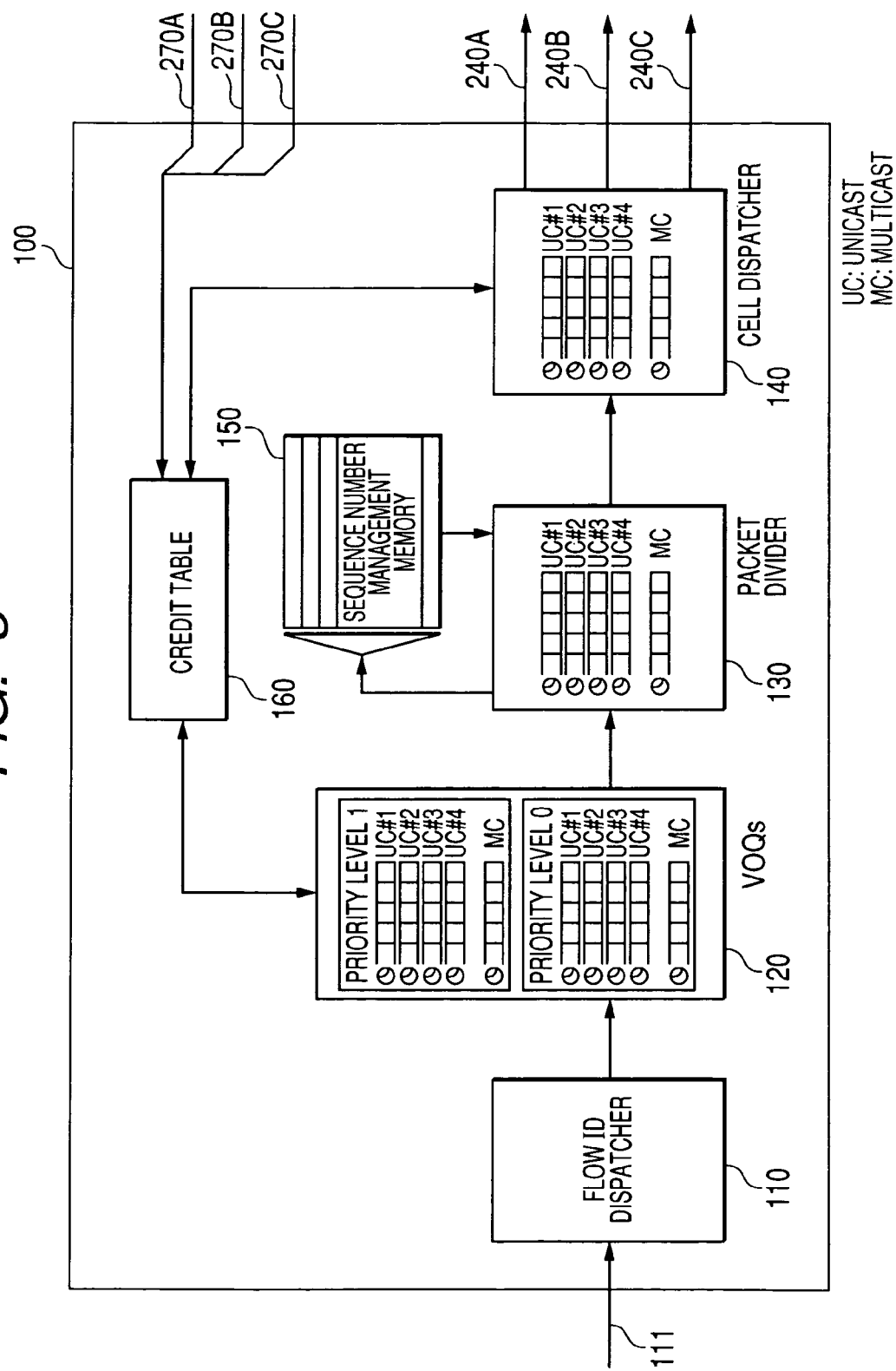
FIG. 3 is a block diagram of a reordering unit in the embodiment of the present invention.

Next, there will be described concretely how each distribution unit distributes cells with reference to FIG. 3. At first, variable length packets are inputted to a distribution unit 100 through a network 111, then those packets are received by a flow ID dispatcher 110. The flow ID dispatcher 110 then assigns a flow ID to each packet to enable the reordering unit 300 to identify the type of each original packet to which received cells belong. When handling only unicast packets addressed to one destination, the reordering unit requires no flow ID. When handling multicast cells addressed to a plurality of destinations, however, the reordering unit 300 requires such a flow ID so as to identify the packet to which subject received cells belong. The digit number of the flow ID is preferably 8 to 10. Although the flow ID is theoretically required to afford ability for identifying packets of x-th power of 2; here x is the number of ports, it is enough to identify packets of a number around the 8-th power of 2 to the 10-th power of 2. This is because there is almost no occasion actually in which multicast packets appear consecutively with respect to every combination of destinations.

After assigning a flow ID to a packet, the flow ID dispatcher 110 holds the packet in a corresponding VOQ (Virtual Output Queue) 120, which is an FIFO (First In First Out) queue prepared independently for each destination and for each priority level in the switch fabric. A multicast VOQ is also prepared for each priority level and a multicast packet, which can cope with any combination of destinations, is held in a multicast VOQ corresponding to its priority level. Each VOQ includes a counter used to count the number of packets in own VOQ. The VOQ also includes a packet timer for counting a period between packet input and packet output with respect to each packet.

Each VOQ 120 monitors the number of packets in own VOQ. Upon dividing a variable length packet into fixed length cells, if the number of the cells exceeds the number of the switching units 200, for example, it exceeds 3 in the example shown in FIG. 2, the VOQ 120 is enabled to output those cells. In case where a plurality of VOQs 120 are enabled to output cells, one of those VOQs 120, which has the top priority level, is selected with use of such an algorithm as the round-robin. Then, the VOQ 120 refers to a credit table 160 to check whether or not the subject destination of the switching units 200 can receive the cells.

The credit table 160 is a mechanism for managing the current capacity of the receive buffer at each destination. The current capacity means the number of cells receivable by the subject receive buffer now and those receivable cells are referred to as credits. FIG. 9 shows an example of the credit table 160 employed in the switch fabric system shown in FIG. 2. An entry in the credit table 160 is independent for each destination and furthermore for each switching unit. In this example, an entry includes 8 credits. This means that each switching unit at each destination currently can receive 8 cells in maximum. The credit table 160 also has a sum of credits for referring destination VOQ 165, which denotes a sum of credits for all the switching units of each destination.

Figure 4:
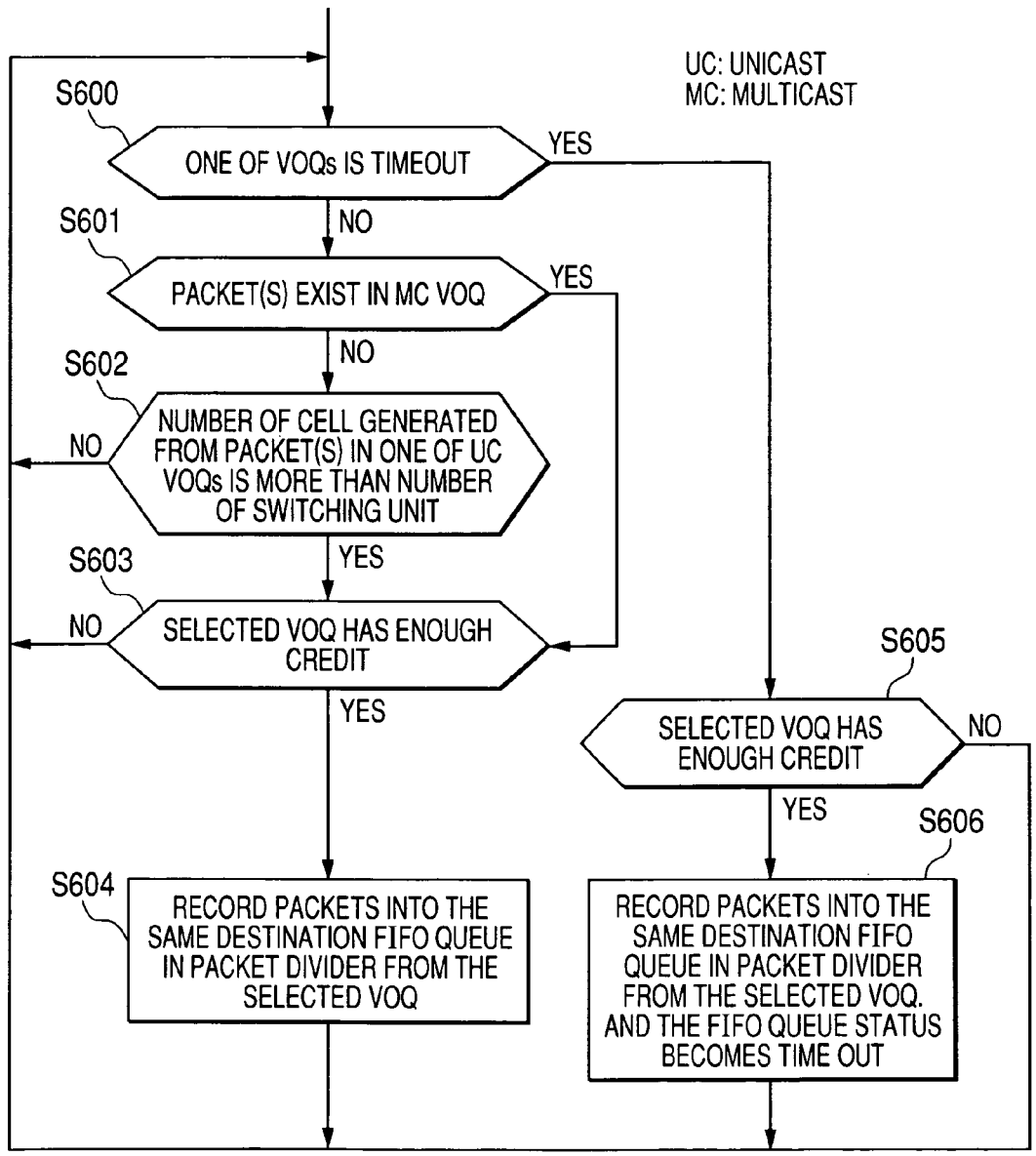
FIG. 4 is a flowchart of a VOQ extracting method in the embodiment of the present invention.

Next, there will be described an embodiment for how to select packets from a VOQ 120 with reference to the flowchart shown in FIG. 4. At first, in step S600, if any timer in the VOQ 120 passes a preset time (timeout), it is decided as a selection candidate at the top priority. Then, in step S605, if the sum of credits for referring destination VOQ 165 of the VOQ 120 selected with use of any algorithm is a positive value, the packets are taken out from the selected VOQ in step S606 and written in the corresponding FIFO queue in the packet divider 130, then the state of the written FIFO queue is regarded as timeout. After this, the number of credits equivalent to the number of taken-out packets is reduced from the corresponding sum of credits for referring destination VOQ 165.

If there is no timeout VOQ 120 found in step S600, control goes to step S601. And if there is a packet found in any of the multicast VOQs in step S601, the VOQ is decided as a selection candidate. Then, if the sum of credits for referring destination VOQ 165 for every subject destination is a positive value in step S603, the accumulated packets are taken out from the selected VOQ in step S604, then written in the corresponding FIFO queue in the packet divider 130. Then, the number of credits equivalent to the number of taken-out packets is reduced from the corresponding sum of credits for referring destination VOQ 165.

If there is no packet found in any of the multicast VOQs 120 in step S601 and if the number of cells generated from packets in any of the unicast VOQs exceeds the number of the switching units in step S602, the VOQ is decided as a selection candidate. Then, if the sum of credits for referring destination VOQ 165 for a unicast VOQ 120 selected with any algorithm is a positive value in step S603, the packets are taken out from the selected VOQ in step S604, then written in the corresponding FIFO queue of the packet divider 130. After this, the number of credits equivalent to the number of taken-out packets is reduced from the corresponding sum of credits for referring destination VOQ 165.

The sum of credits for referring destination VOQ 165 consumed in the VOQ 120 is recovered as many as the number of recovery credits received from the subject switching unit through the line 270.

The packet divider 130 is a mechanism for dividing each packet into cells. The packet divider 130 includes one unicast FIFO queue prepared for each destination, as well as only one multicast FIFO queue. Each FIFO queue inputs packets and outputs cells and holds packets that are being divided into cells. Each FIFO queue also includes a packet timer for counting a period between packet input and packet output with respect to each packet.

Figure 5:
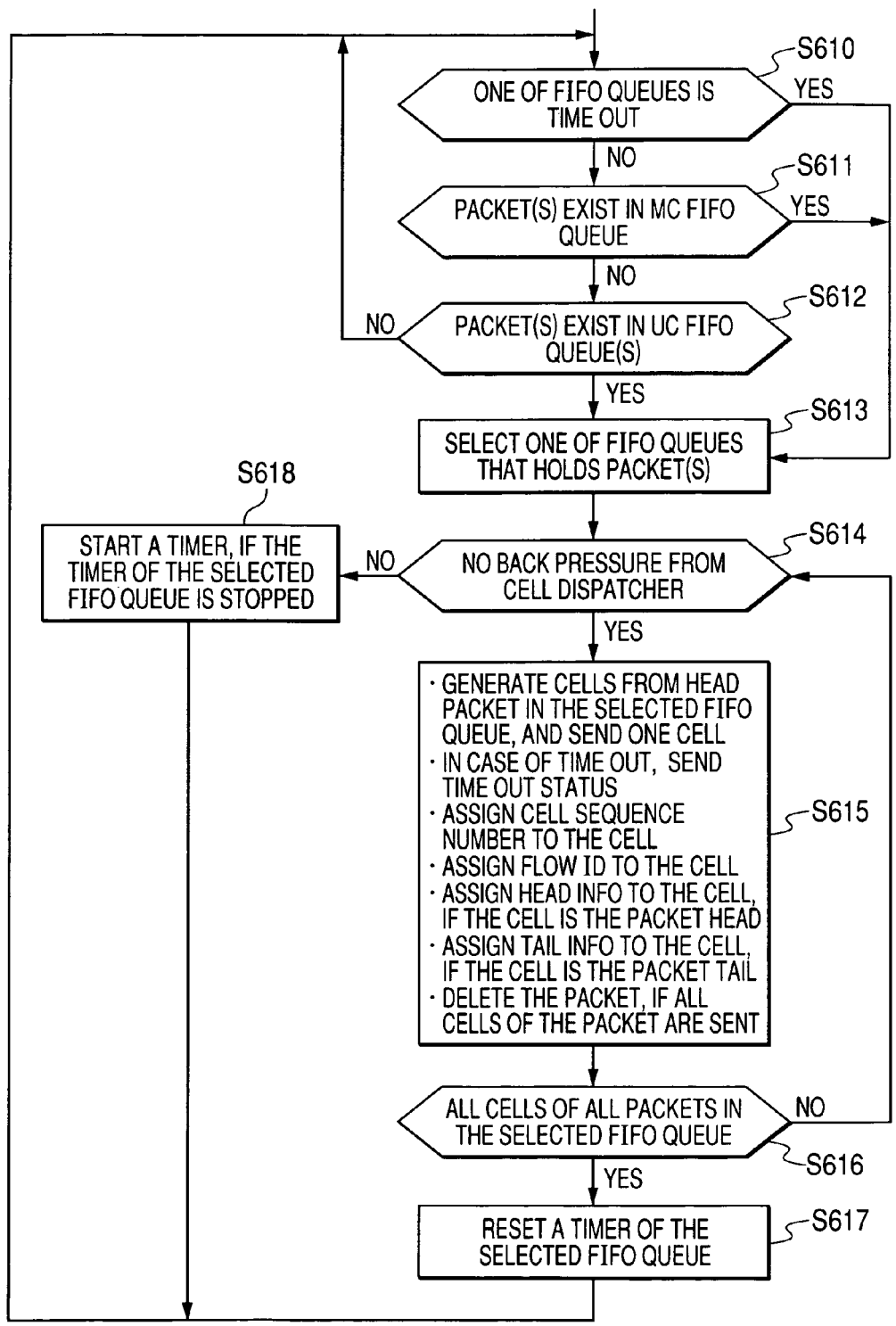
FIG. 5 is a flowchart of a packet divider outputting method in the embodiment of the present invention.

Next, there will be described an embodiment for how to output cells from each FIFO queue of the packet divider 130 with reference to the flowchart shown in FIG. 5. At first, if there is any timeout FIFO queue found in step S610, it is decided as a selection candidate at the top priority. If there is no timeout FIFO queue and there is any packet in the multicast FIFO queue, the multicast FIFO queue is selected in step S611. If there is no multicast entry and if there is an entry in any unicast FIFO queues, one FIFO queue is selected from among those having any entry therein (S613).

Here, there will be described the cell dispatcher 140 at first. The cell dispatcher 140 also includes an FIFO queue corresponding to each FIFO queue of the packet divider 130. The FIFO queue of this packet dispatcher 140 holds only cells. If any FIFO queue of the cell dispatcher 140 becomes full and cannot accept cells any more, a back pressure is applied to the corresponding FIFO queue of the packet dispatcher 130 allocated to the same destination, thereby the FIFO queue is inhibited to pass any cell to the cell dispatcher 140.

Return to the description of step S614 in the flowchart shown in FIG. 5 again. If a back pressure is applied to the FIFO queue selected in step S613 from the cell dispatcher 140 described above, control goes to step S618. And if the timer of the selected FIFO queue is not started yet, the timer is started. Then, control returns to the check in step S610 without outputting any cells from the selected FIFO queue in step S618.

Otherwise, control goes to step S615 in which the head packet in the selected FIFO queue is divided into preset length cells and header information is added to each of the generated cells. After this, only one cell of data is sent to the cell dispatcher 140 first. The header information added in this step consists of a packet flow ID and a cell sequence number. Furthermore, if the cell is a head cell of the packet, head information is added to the cell and if the cell is a tail one, tail information is added to the cell. When a packet is divided into cells completely, the packet in the FIFO queue is deleted. If a timeout occurs in the FIFO queue in which a packet is divided into cells, the state of the corresponding FIFO queue in the cell dispatcher 140 also goes into timeout.

The packet flow ID is a value given by the flow ID dispatcher 110.

The cell sequence number is a value given upon accessing the sequence number management memory 150 with a flow ID. The memory 150 has an entry for each flow ID. The sequence number managed by each entry of the sequence number management memory 150 begins at 0 and increases one by one each time the entry is accessed. When the maximum value is reached, it is returned to 0 cyclically. (The maximum value means an approximate value at which the same number does not appear while cells are passing through the switch fabric system.)

Then, control goes to step S616. If dividing all the packets in the selected FIFO queue into cells is not finished yet, control returns to step S614. If it is confirmed that all the packets in the selected queue are divided into cells respectively in step S616, the timer of the FIFO queue is reset (if it is already started) and control returns to step S610.

Figure 6:
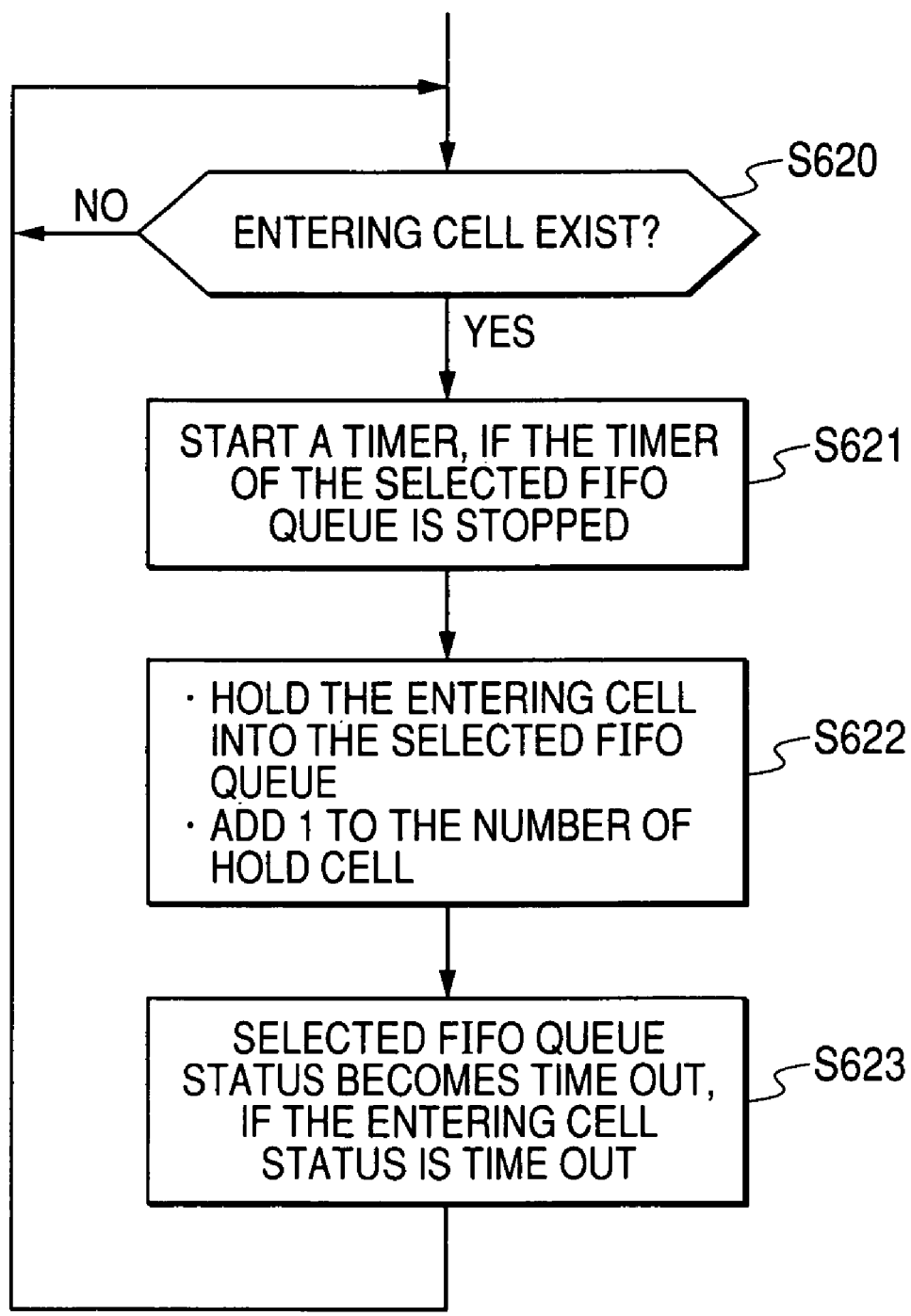
FIG. 6 is a flowchart of a cell dispatcher receiving method in the embodiment of the present invention.

Next, there will be described an embodiment for how each FIFO of the cell dispatcher 140 receives cells with reference to FIG. 6. At first, in step S620, the subject FIFO waits for an input of cells from the packet divider 130. The FIFO, upon receiving an input of cells, starts up the timer in step S621 if the timer is idle. Then, the FIFO holds the cells in an entry thereof in step S622 and adds one to the number of hold cells. In step S623, if a received cell has timeout information, the FIFO queue is also set in the timeout state.

Figure 7:
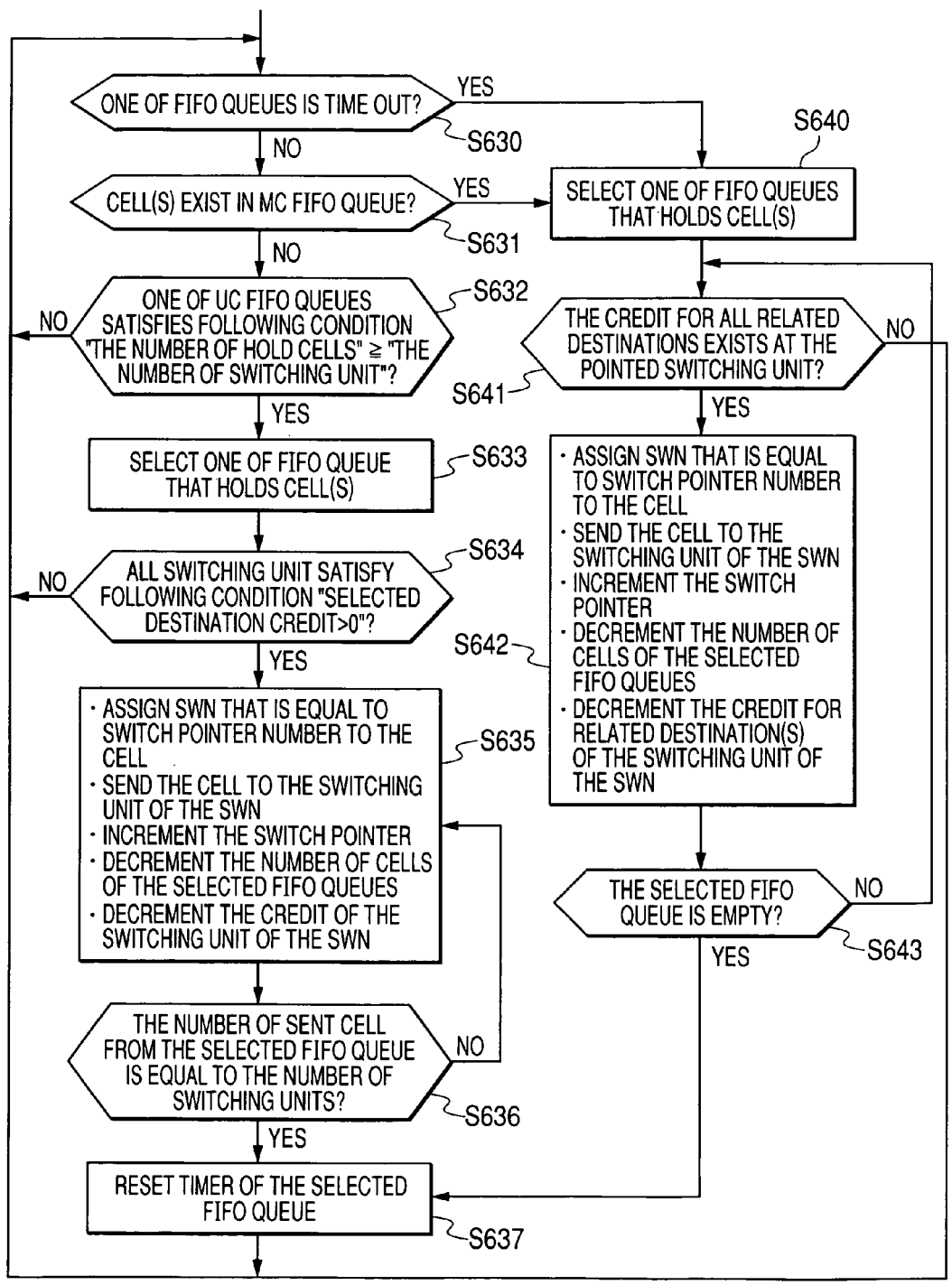
FIG. 7 is a flowchart of a cell dispatcher outputting method in the embodiment of the present invention.

Next, there will be described an embodiment of how each FIFO of the cell dispatcher 140 outputs cells with reference to FIG. 7. The cell dispatcher 140 is a mechanism for assigning cells to proper switching units and sending those cells to the switching units respectively. At first, if there is one or more timeout FIFO queues found in step S630, the cell dispatcher 140 selects one of them (S640). If there is no timeout FIFO and if any cells exist in the multicast FIFO queue, the cell dispatcher 140 selects the multicast FIFO queue in step S631 (S640).

The cell dispatcher 140 includes a switch pointer for denoting an object switching unit 200 to which cells are to be sent and moves the switch pointer to the next switching unit each time the dispatcher 140 sends out one cell. For example, if there are three switching units as shown in FIG. 2, the switch pointer moves to switching unit 1->switching unit 2->switching unit 3->switching unit 1 cyclically each time the dispatcher 140 sends out one cell. In step S641, the cell dispatcher 140 refers to the credit table 160 and checks whether or not the number of credits 161 for all the object destinations of every switching unit pointed by the switch pointer is a positive value (S641).

If the credit 161 is a negative value, cell sending is disabled. Thus cell sending from the subject FIFO is canceled and control returns to step S630.

If the credit 161 is a positive value, the cell dispatcher 140 adds header information (the switch pointer denoted switching unit number) to the head cell in the selected FIFO queue, then sends the cell to the object switching unit 200 in step S624. Then, the cell dispatcher 140 shifts the switch pointer by one and reduces the number of hold cells by one from the selected FIFO queue. Furthermore, the cell dispatcher 140 reduces the number of credits for the object switching units 161 of the object destination by one in the credit table 160. If the number of cells in the selected FIFO queue is not reset to 0 yet even after the cell sending described above, control returns to step S641 again from step S643 and the cell dispatcher 140 continues cell sending check.

If the number of hold cells in the selected FIFO queue is found to be 0 in step S643, it means that all the subject cells are sent out completely. Thus control goes to step S637 in which the cell dispatcher 140 resets the timer of the FIFO queue and control returns to step S630.

If there is no cell found in the multicast FIFO queue in step S631, control goes to step S632 and the cell dispatcher 140 checks whether or not there is any unicast FIFO queue in which the number of hold cells exceeds the number of the switching units. If the check result is NO, control returns to step S630. If the check result is YES, the cell dispatcher 140 selects one of the FIFO queues in step S633 and checks whether or not the number of credits for all the switching units 161 of the object destination in the credit table 160 is a positive value. If the check result is NO (not positive), the cell dispatcher 140 returns to step 630 without sending out any cells.

If the check result is YES (positive), the cell dispatcher 140 goes to step S635 to add head information (the switching pointer pointed switching unit number) to the head cell in the selected FIFO queue, then sends the head cell to the object switching unit 200 through the line 240. After this, the cell dispatcher 140 moves the switch pointer forward by one and reduces the number of hold cells by one in the selected FIFO queue. Furthermore, the cell dispatcher 140 reduces the credit 161 for the object switching unit of the object destination in the credit table 160 by one. Here, the cell dispatcher 140 repeats the processing in step S635 until it completes sending the same number of cells as the number of switching units. Then, the cell dispatcher 140 goes to step S637 to reset the timer of the selected FIFO queue and returns to step S630.

The credit 161 for each switching unit consumed in the cell dispatcher 140 is recovered as many as the number of the recovery credits received from the subject switching unit 200 through the line 270.

If the distribution unit 100 and the reordering unit 300 are provided on the same LSI, instead of the line 270 used for sending recovery credits from the switching unit 200 to the credit table 160 of the reordering unit 100, the line 250 used for sending cells from the switching unit 200 to the reordering unit 300 can be used similarly. Concretely, the recovery credit information to be sent from the switching unit 200 to the distribution unit 100 can be included in part of the header information of each cell to be sent to the reordering unit 300 from the switching unit 200 through the line 250.

If the distribution unit 100 and the reordering unit 300 are provided on different LSIs, the line 270 used for sending the recovery credit information is separated from the line 250 used for sending cells from the switching unit 200 to the reordering unit 300.

FIG. 8 shows a flowchart of the processings of the cell dispatcher 140 that generates a back pressure signal to be sent to the packet divider 130 in an embodiment of the present invention. At first, the cell dispatcher 140 checks whether or not there is any FIFO queue in which the number of hold cells exceeds the number of switching units in step S650. If the check result is YES, the cell dispatcher 140 applies a back pressure to the corresponding FIFO queue in the packet divider 130 in step S653. If the check result is NO, the cell dispatcher 140 checks whether or not there is any FIFO queue in which the number of hold cells is the same as the number of switching units in step S651. If the check result is YES and the FIFO queue outputs no cells and inputs cells, the cell dispatcher 140 applies a back pressure to the corresponding FIFO queue in the packet divider 130 in step S653. If the check result is NO in both steps S651 and 652, the cell dispatcher 140 resets the back pressure to the corresponding FIFO queue in the packet divider 130 in step S654.

This completes the description of a concrete embodiment in which the distribution unit 100 divides each variable length packet into fixed length cells and sends those cells addressed to the same destination as evenly as possible. According to the present invention, unicast packets can be sent to each switching unit 200 from the distribution unit 100 by a unit of the same number of cells as the number of switching units 200 in the switch fabric system.

When the number of cells generated from a packet differs from the number of switching units 200, the surplus cells are put together with the cells generated from the next unicast packet addressed to the same destination, thereby they are sent to each switching unit by a unit of the same number of switching units 200 due to the mechanisms of the VOQ 120, the packet divider 130, and the cell dispatcher 140. Furthermore, if the next unicast packet addressed to the same destination does not arrive while there are some surplus cells as described above, those surplus cells can be sent to each switching unit 200 forcibly due to the timeout mechanism. In other words, if some surplus cells are left over after cells are sent by a unit of the same number of cells as the number of switching units 200, the timer is started up and when the timer reaches a predetermined threshold value, those surplus cells waiting for the next packet addressed to the same destination are sent to each switching unit 200 forcibly without holding them no longer. The cell dispatcher 140 is provided with such a forcible sending mechanism.

As for multicast packets, it hardly occurs that multicast packets addressed to a combination of a plurality of same destinations are sent continuously. Unlike unicast packets, therefore, multicast packets are designed so that they are sent from a subject distribution unit 100 to each switching unit 200 immediately after they are received.

Figure 10:
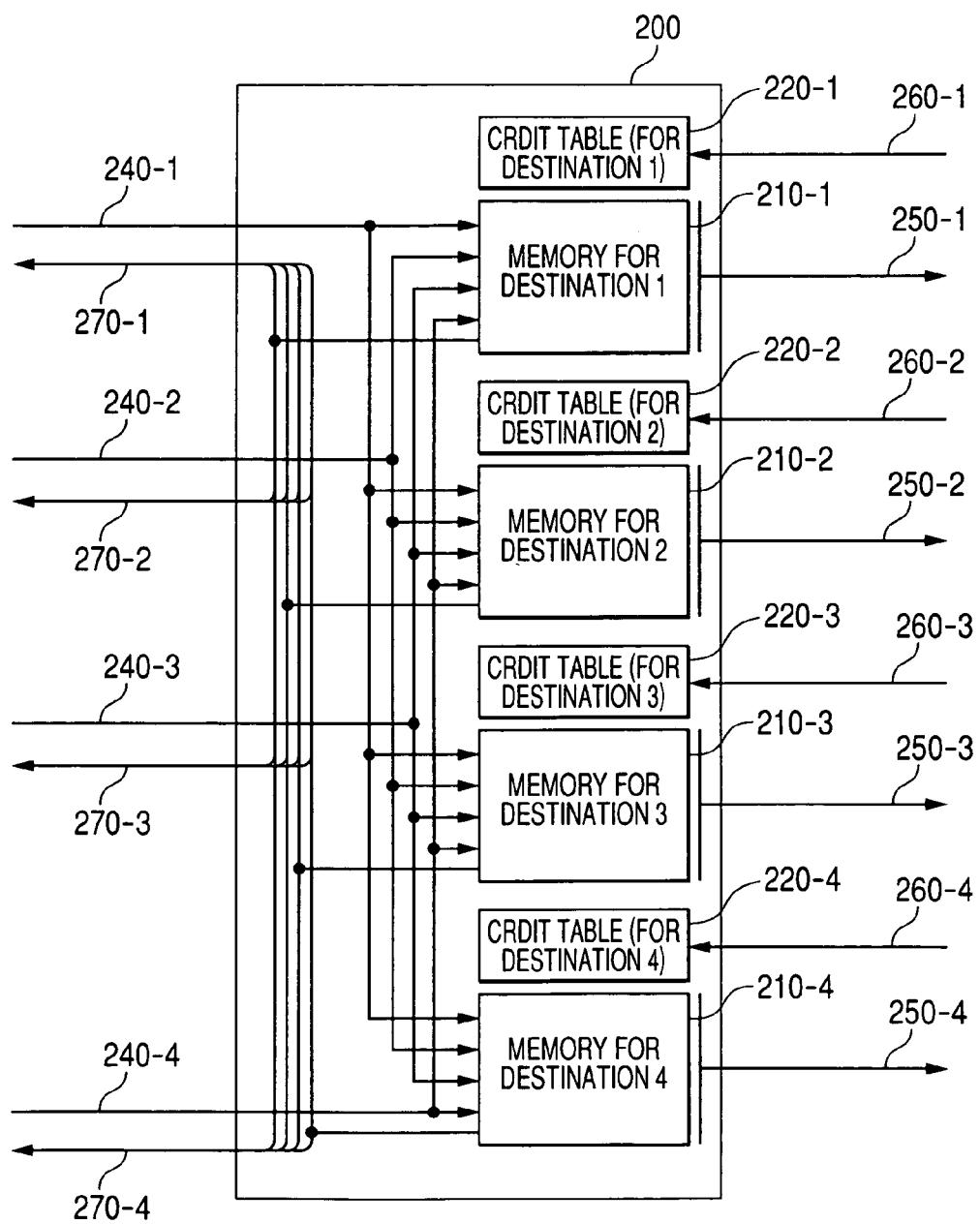
FIG. 10 is a block diagram for showing the switching unit in the embodiment of the present invention.

Next, there will be described an embodiment of the switching unit 200 with reference to FIG. 10. Each switching unit 200 consists of a plurality of memories 210, each corresponding to a destination. Upon receiving cells, the switching unit 200 stores those cells in their corresponding destination memories 210 respectively. Multicast cells are all stored in the corresponding destination memories 210 respectively. Each memory 210 has a storage area allocated to each source. Upon receiving cells, each memory 210 selects one of those cells with use of an impartial selection algorithm such as the round-robin and sends the selected cell to the receive buffer of the reordering unit at the destination if the buffer has an empty space. The memory 220 returns the recovery credits one by one for each cell through the corresponding line 260 to the corresponding distribution unit 100, which is the source of the selected cell.

While one memory 210 is allocated for each destination, each memory 210 may be shared by a plurality of destinations and used in a time sharing manner so as to reduce the memory capacity. In this case, the credits managed by each credit table 220 are also reduced in proportion of the reduction of the memory capacity.

The credit table 220 of each switching unit 200 is used to check whether or not an empty space exists in the receive buffer of the subject reordering unit 300. FIG. 11 shows an example of a configuration of each credit table 220 of a switching unit 200. A credit table 220 is provided for each destination independently and the table 220 has at least one credit 221 for each source and a plurality of credits common among the sources (8 common credits 222 in the example shown in FIG. 11).

When cells are sent from a switching unit 200 to a reordering unit 300, the credit 221 for a source from which cells are to be sent is reduced by one if the credit 221 is not zero. If the credit 221 is zero, one common credit 222 is reduced. If the credit 221 for a source, which is to be recovered according to its source number does not reach the maximum value (if it is not 1 in the example shown in FIG. 11) when a recovery credit arrives from a reordering unit 300, the credit (one) for the source is recovered. Otherwise, one common credit 222 is recovered.

If a distribution unit 100 and a reordering unit 300 are provided on the same LSI, instead of the line 260 used for sending recovery credits to the credit table 220 of a switching unit 200 from a credit generator 370 of the reordering unit 300, the line 240 used for sending cells to the switching unit 200 from the distribution unit 100 may be used similarly. Concretely, each recovery credit to be sent from a reordering unit 300 to a switching unit 200 can be sent by including it in part of the head information of a cell to be sent to the switching unit 200 from the distribution unit 100 through the line 240.

If a distribution unit 100 and a reordering unit 300 are provided on different LSIs, the line 260 used for sending recovery credits and the line 240 used for sending cells to a switching unit 200 from a distribution unit 100 are separated from each other.

The memory 210 for each destination of a switching unit 200, upon selecting a cell, may select any cell if the value of the common credits 222 for all the sources in the credit table 220 is positive. However, if the value of the common credits 222 described above is zero, the memory 210 selects a cell only from among those of which credits for the corresponding sources are positive values respectively. This rule is used upon restoring an original order of cells in each reordering unit to prevent the dead lock status in which cells from a source are obstructed by cells from another source, thereby they are never sent out from the switching unit 200.

Next, there will be described an embodiment of the reordering unit 300 of the present invention with reference to FIG. 12. At first, the operations of the reordering unit will be described briefly. The reordering unit 300 receives cells at its receive buffer 310 from each switching unit through the line 250. The reordering unit then passes part of the cell header information and additional information of each cell to the object flow reordering part 330 through a selector 320 while holding the received cell body in the receive buffer 310, thereby detecting a head cell of each flow at more than one flow reordering part 330.

Upon detecting some head cells, the reordering unit 300 selects one of those head cells through its selector 340 and selects the cell from the receive buffer 310, then passes it to the packet reassembler 360 through the selector 350. At the same time, the reordering unit 300 notifies the credit regenerator 370 of an empty area secured in the corresponding receive buffer 310. The credit regenerator 370 then generates a recovery credit that includes the source number of the cell, then sends the recovery credit to the switching unit 200 corresponding to the receive buffer 310 from which the cell has been output through the line 260.

The packet reassembler 360 includes means for temporarily holding cells of each flow. The means holds cells having the same source and flow numbers sequentially so as to follow the cell having the head information added by the distribution unit 100. Then, upon receiving the cell having the tail information added by the distribution unit similarly, the packet reassembler reassembles those cells into the original packet and outputs the packet.

The feature of the present invention is enabling each flow to be restored with a small scale of resources. In case of any of the conventional methods, at least it requires a memory space that can cope with the number of flows represented by a product of source and flow numbers respectively, for example, a memory space capable of storing 100 cells so as to correct cell ordering errors to occur. Consequently, any of the conventional methods cannot suppress an increase of the quantity of hardware, particularly an increase of the required memory capacity.

The reordering unit 300 of the present invention sends/receives cells to/from the switching unit 200. The reordering unit 300 is designed so as to restore each original order of cells received in random order with use of only the memory of the receive buffer of which capacity is approximately the same as the total number of cells received from all the switching units before sending back the recovery credit. The memory capacity required by the reordering unit 300 of the present invention is far less than the memory capacity of any conventional reordering units (at least less than the memory capacity denoted by the product of the source number, flow number, and the number of entries correctable when an original order of cells is lost). Thus the manufacturing cost can be reduced significantly.

In the normal state, cells should be distributed so as to prevent significant disordering and so as not to obstacle the restoring of each original order of cells in the reordering unit 300 even when the reordering unit 300 is not provided with a sufficient memory capacity. According to the present invention, the distribution unit 100 distributes cells to all the destinations through all the switching units 200 as far as possible, so that significant disordering of cells hardly occurs. Thus such a disordering problem never occurs in the normal state.

Next, there will be described details of the flow reordering part 330 for restoring each original order of cells with use of only the memory of the receive buffer 310. As described above, the memory capacity is very small.

The number of flow reordering parts 330 should preferably be the same as the number of the distribution units 100 that are sources. However, one flow reordering part may be shared by a plurality of sources. For example, if there are 16 sources, 16 flow reordering parts 330 should preferably be prepared. However, in order to suppress the logic amount from increasing, it is possible to prepare only 8 flow reordering parts 330 and a specific one flow reordering part 330 may be shared by other two specific sources. Similarly, it is also possible to prepare only 4 flow reordering parts and another specific flow reordering part 330 may be shared by other specific 4 sources.

Figure 13:
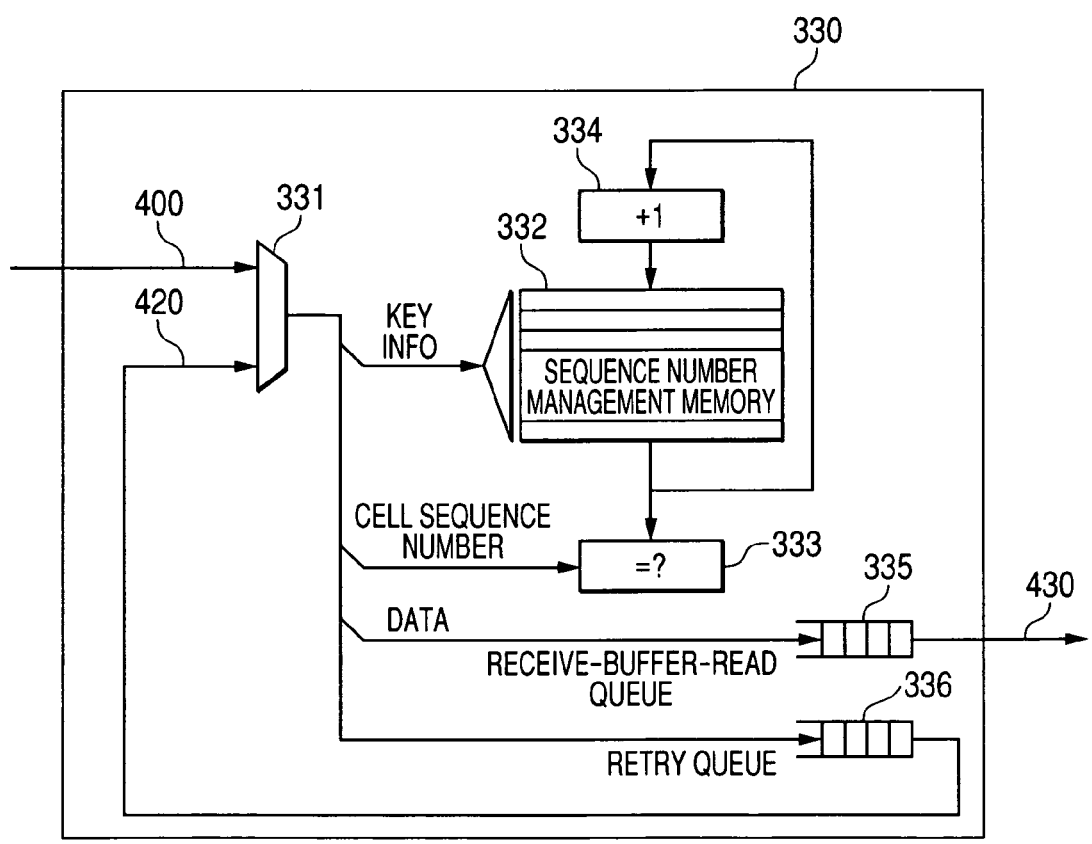
FIG. 13 is a block diagram for showing a flow reordering part in the embodiment of the present invention.

FIG. 13 shows an embodiment of the flow reordering part 330. The flow reordering part 330 includes a sequence number management memory 332, a sequence number comparator 333, a receive-buffer-read queue 335, and a retry queue 336.

Part of the header information and additional information of each cell received from each switching unit 200 are inputted to the corresponding flow reordering part 330 through an input 400. Generally, the header information is smaller than the cell body in size, so that the header information is inputted once in several machine cycles. The header information mentioned above means a set of the source, flow, and sequence numbers. The additional information mentioned above means a set of an address in the receive buffer 310 in which the cell body is recorded, as well as the number of the switching unit 200 through which the cell is passed.

In the flow reordering unit 330, various types of information described above is classified into three types; key information, sequence number, and data.

The key information mentioned above means an index used for accessing the sequence number management memory 332. In this embodiment, the key information consists of a source number and a flow number.

Data mentioned above means information used for reading a cell body from the receive buffer 310. In this embodiment, the data consists of an address in the receive buffer 310 and the number of the subject switching unit 200.

Figure 14:
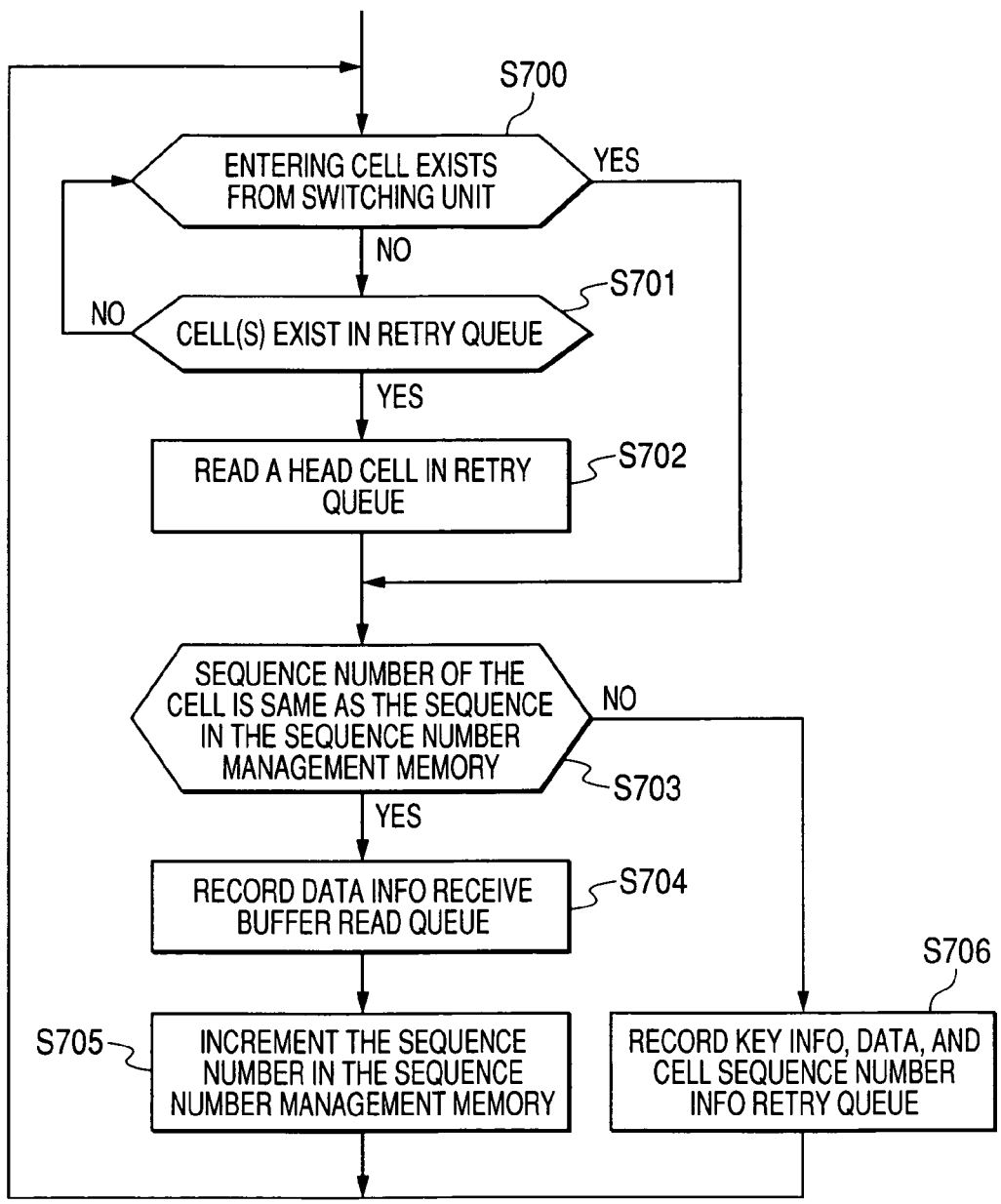
FIG. 14 is a flowchart of flow reordering processings shown in FIG. 12 in the embodiment of the present invention.

Next, there will be described the operation of the flow reordering part 330 shown in FIG. 13 with reference to the flowchart shown in FIG. 14. In step S700, if the flow reordering part 330 receives a cell from a switching unit 200 through the input 400, the flow reordering part 330 refers to the sequence number management memory 332 according to the cell header key information to read the sequence number of the current head cell of the flow.

Then, in step S703, the comparator 333 of the flow reordering part 330 makes a comparison between the read sequence number and that of the inputted cell. If they are the same, the flow reordering part 330 records the cell data in the receive-buffer-read queue 335 in step S704, then adds one to the read sequence number through the adder 334 in step S705, then writes back the result in the sequence number management memory 332.

If the sequence numbers are not the same in step S703, the flow reordering part 330 records the key information, sequence number, and data of the cell in the retry queue 336.

If the flow reordering part 330 receives no cell from the switching unit 200 through the input 400 in step S700 and the retry queue 336 has an entry, the flow reordering part 330 reads the head entry from the retry queue 336 in step S702, then refers to the sequence number management memory 332 through the input 420 just like in the above case and repeats the processings in steps S703 to S705 or S706.

By repeating the above processings, cells inputted to the flow reordering part 330 in random order are reordered in the original order in each of various types of flows received from each source and the result is recorded in the receive-buffer-read queue 335. Such way, the original order of the cells can be restored completely in each flow when the cell data is read sequentially from the head entry from the receive-buffer-read queue 335 through the output 430 and each cell body is read from the receive buffer 310.

Figure 17A:
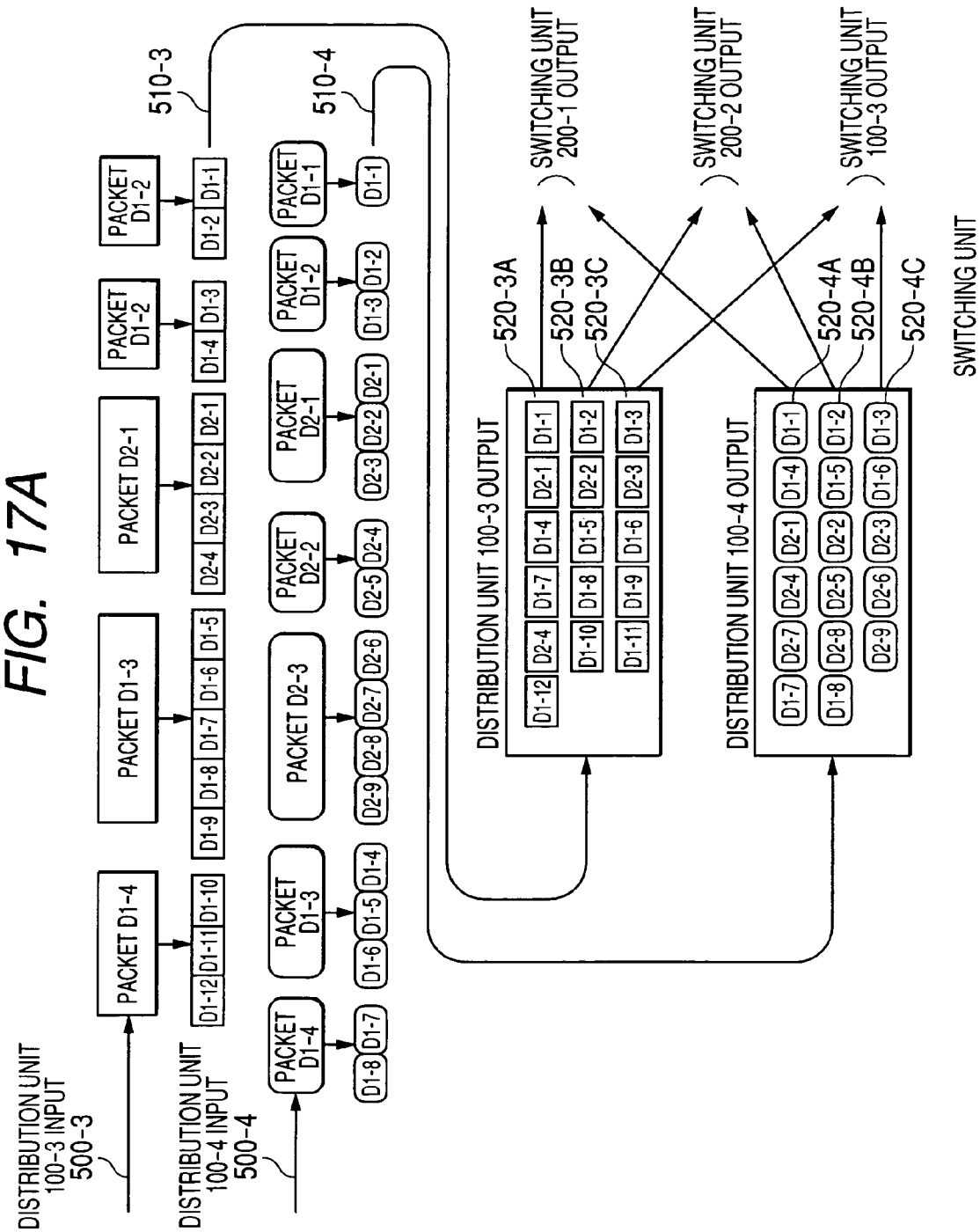
FIG. 17A is a diagram for describing flows of packets and cells according to the present invention.
Figure 17B:
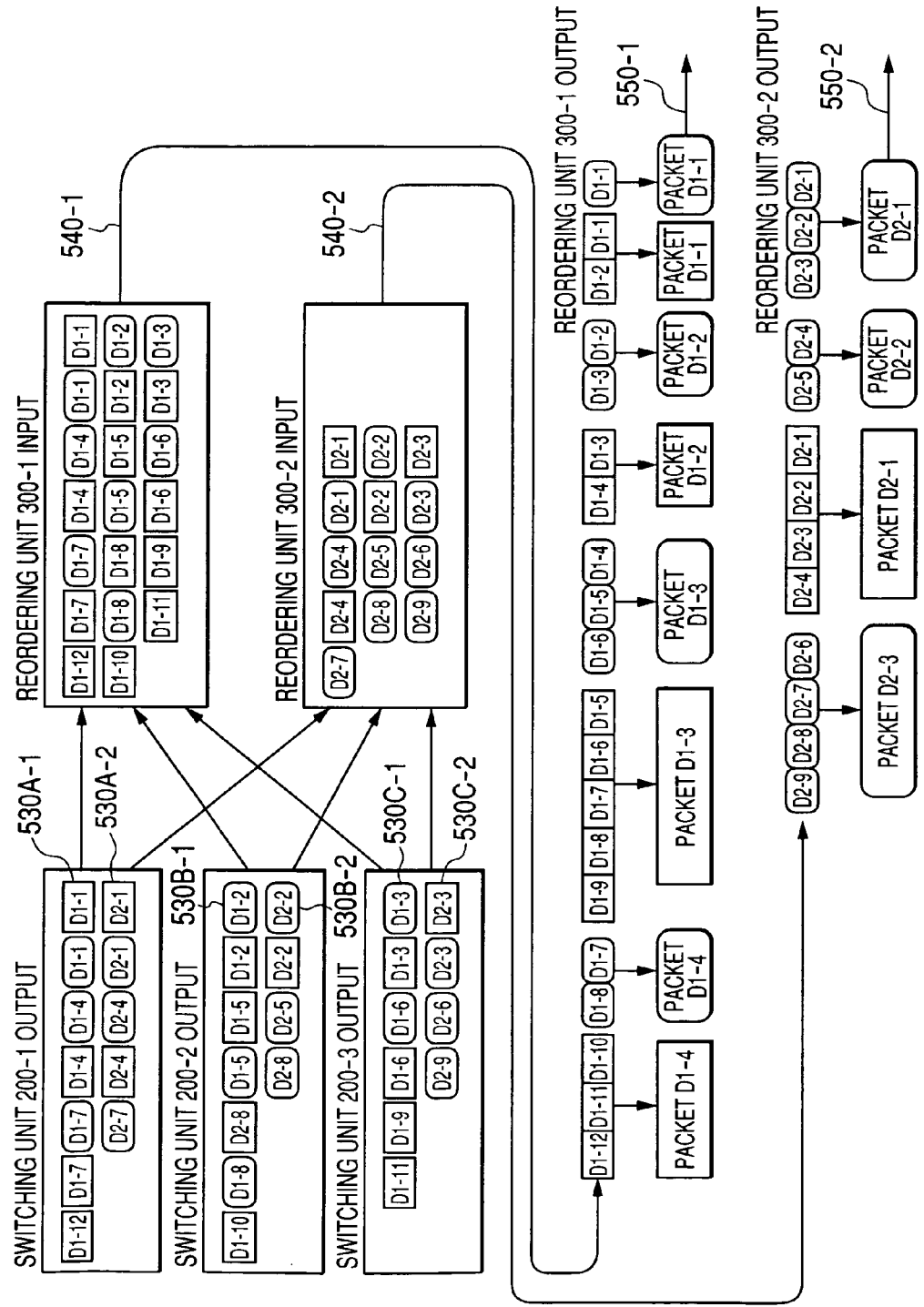
FIG. 17B is a diagram for describing flows (continued) of packets and cells according to the present invention.

FIGS. 17A and 17B show images for describing how packets are passed through the multi-plane cell switch fabric system according to the present invention. It is premised here that packets are sent from the distribution units 100-3 and 100-4 to the reordering units 300-1 and 300-2. The packets are all assumed as unicast packets. Rectangles and rounded rectangles denote packets that are described as D1 respectively when their destination is the reordering unit 300-1 and as D2 when their destination is the reordering unit 300-2. And their numbers in their flow with respect to each destination follow those D1 and D2. Similar numbers are also described in fixed length cells generated from variable length packets respectively. However, "the number in a flow with respect to each destination" described in each cell is a "sequence number" in each flow that appears in the description of this embodiment. In this example, each rectangle denotes an input to the distribution unit 100-3 and each rounded rectangle denotes an input to the distribution unit 100-4.

The variable length packets 500-3 inputted to the distribution unit 100-3 and the variable length packets 500-4 inputted to the distribution unit 100-4 are divided into the corresponding number of fixed length cells 510-3 and 510-4 respectively.

Because each distribution unit 100 includes three switching units 200, each distribution unit 100 selects cells by a unit of integer multiple of 3 with respect to each destination and outputs those cells to the corresponding switching units 200 as cells 520-3A to 3C and 520-4A to 4C respectively. If the length of any original packet does not become a multiple of 3, the packet is output when a timeout occurs after a certain time. For example, the cells D2-4 output from the distribution unit 100-3 are output after such a timeout occurs. After the timeout event occurs, cells can be selected by a unit of integer multiple of 3 with respect to each destination again. Thus three cells D1-10, D1-11, and D1-12 are output consecutively.

Each switching unit 200 makes output arbitration for each destination while keeping the input order of cells from each distribution unit 100 and sends cells to the reordering unit 300 of the destination as cells 530-A1 to A2, 530-B1 to B2, and 530-C1 to C2.

Each reordering unit 300 classifies received cells by sources and by flows (one unicast flow each in this case) and restores the original order of those cells in flows 540-1 and 540-2 and furthermore restores their original packets 550-1 and 550-2.

While the preferred form of the present invention has been described with respect to the details of a multi-plane cell switch fabric system, it is to be understood that modifications will be apparent to those skilled in the art without departing from the spirit of the invention.

Second Embodiment

Next, there will be described a second embodiment of a multi-plane cell switch fabric system including a reordering unit capable of restoring each flow in a shorter time than the reordering unit in the first embodiment. The configurations of the distribution unit 100 and the switching unit 200 in this second embodiment are the same as those described with reference to FIG. 1, etc. in the first embodiment. As for the configuration of the reordering unit, there is only a difference between this second embodiment and the first embodiment; a flow reordering part is provided in the reordering unit in this second embodiment. Therefore, there will be described the configuration and operation of only the flow reordering part 330' in detail in this second embodiment.

Figure 15:
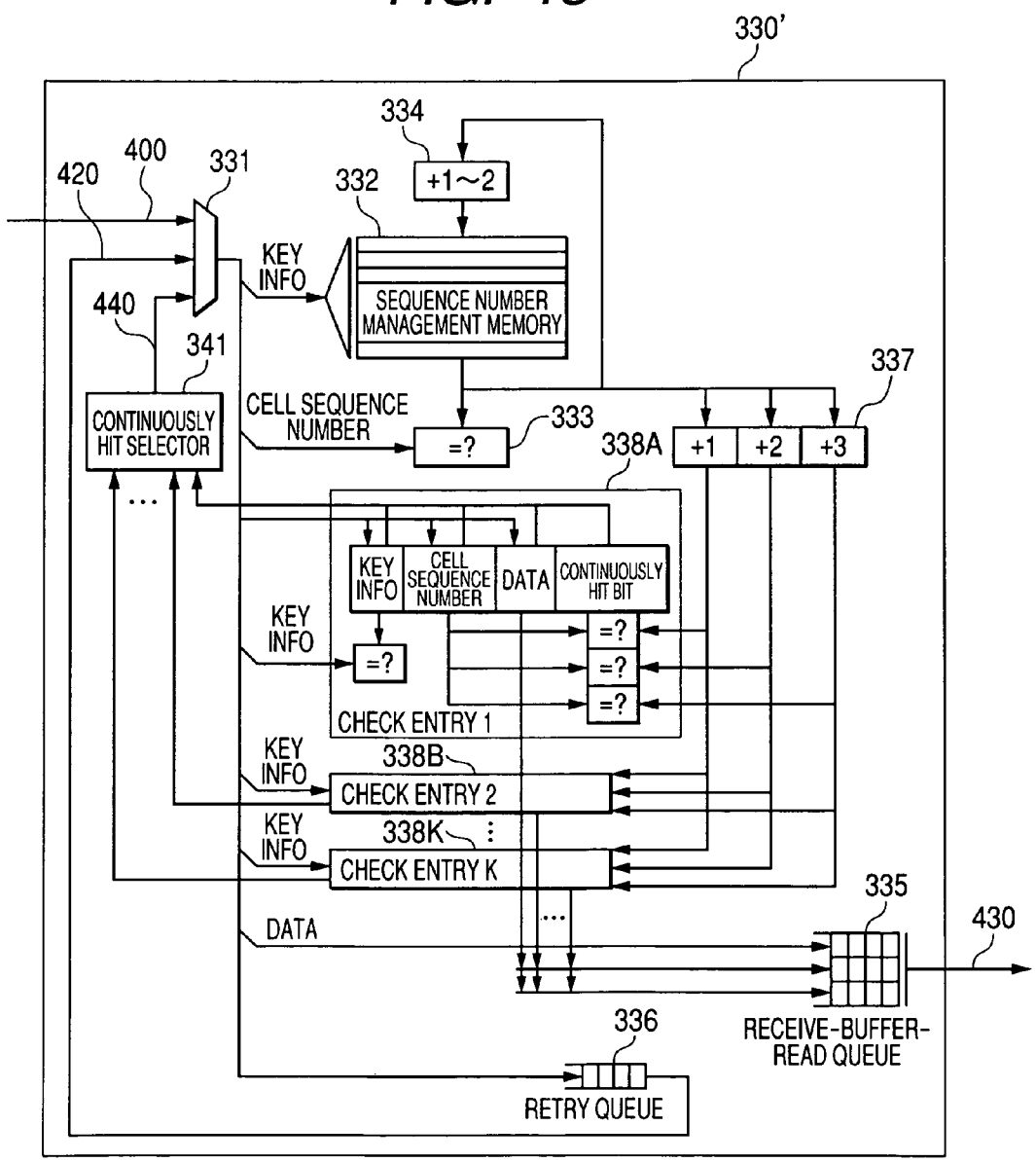
FIG. 15 is a block diagram of the flow reordering part that includes check entries in the embodiment of the present invention.

The flow reordering part 330' in this second embodiment, as shown in FIG. 15, includes a sequence number management memory 332, a sequence number comparator 333, a receive-buffer-read queue 335, a retry queue 336, a continuous sequence number generator 337, check entries 338A to 338K, and a continuously hit selector 341. A check entry means a mechanism for temporarily recording the source number, flow number, and sequence number of each cell that is not a head cell of the subject flow, as well as the cell address in the receive buffer 310 for recording the cell body and the number of the subject switching unit 200 through which the cell is passed. The check entry mechanism records those various types of information items described above when it is decided as a result of a head check that a cell received from the switching unit 200 is not a head cell. Hereinafter, each time a cell is received from a switching unit, all the information items temporarily recorded in the check entries 338A to 338K are checked.

If a cell received from a switching unit is a head cell of a subject flow, a cell recorded in any of the check entries 338A to 338K might be the next head cell, and a cell in another check entry might be the head cell after the next. Such way, head cells might be found one after another. In the flow reordering part 330 shown in FIG. 15, therefore, if a cell received from a switching unit 200 is a head of a subject flow, up to three consecutive head cells are detected simultaneously from the check entries 338A to 338K. The sequence numbers of those 3 consecutive head cells are generated by the continuous sequence number generator 337.

There might also be some occasions in which the fourth and subsequent head cells are found consecutively in the check entries 338A to 338K. In order to cope with such an occasion, each of the check entries 338A to 338K is provided with an information field referred to as a consecutively hit bit. This consecutively hit bit is enabled when the third head cell is detected. Then, the consecutively hit selector 341 is used to select information of any check entry in which the continuously hit bit is enabled and the sequence number management memory 332 makes the head cell check through the input 440, thereby checking whether or not the fourth and subsequent head cells are present.

The receive-buffer-read queue 335 in this second embodiment is a multi-input and 1-output queue. In the configuration shown in FIG. 15, the receive-buffer-read queue 335 is a 3-input and 1-output queue. This 3-input queue is employed so as to cope with finding of three consecutive head cells like a head cell in a flow, the next head cell in the flow, and the head cell after the next. The 1-output queue is employed, since 3 cell bodies are never read simultaneously from the corresponding receive buffer 310, but they are always read one by one. Precisely, 3 information items are read simultaneously from the receive-buffer-read queue 335 and output one by one in the order of sequence number +0 position, sequence number +1 position, and sequence number +2 position through the output 430 and the cell bodies are read from the corresponding receive buffer 310.

Figure 16:
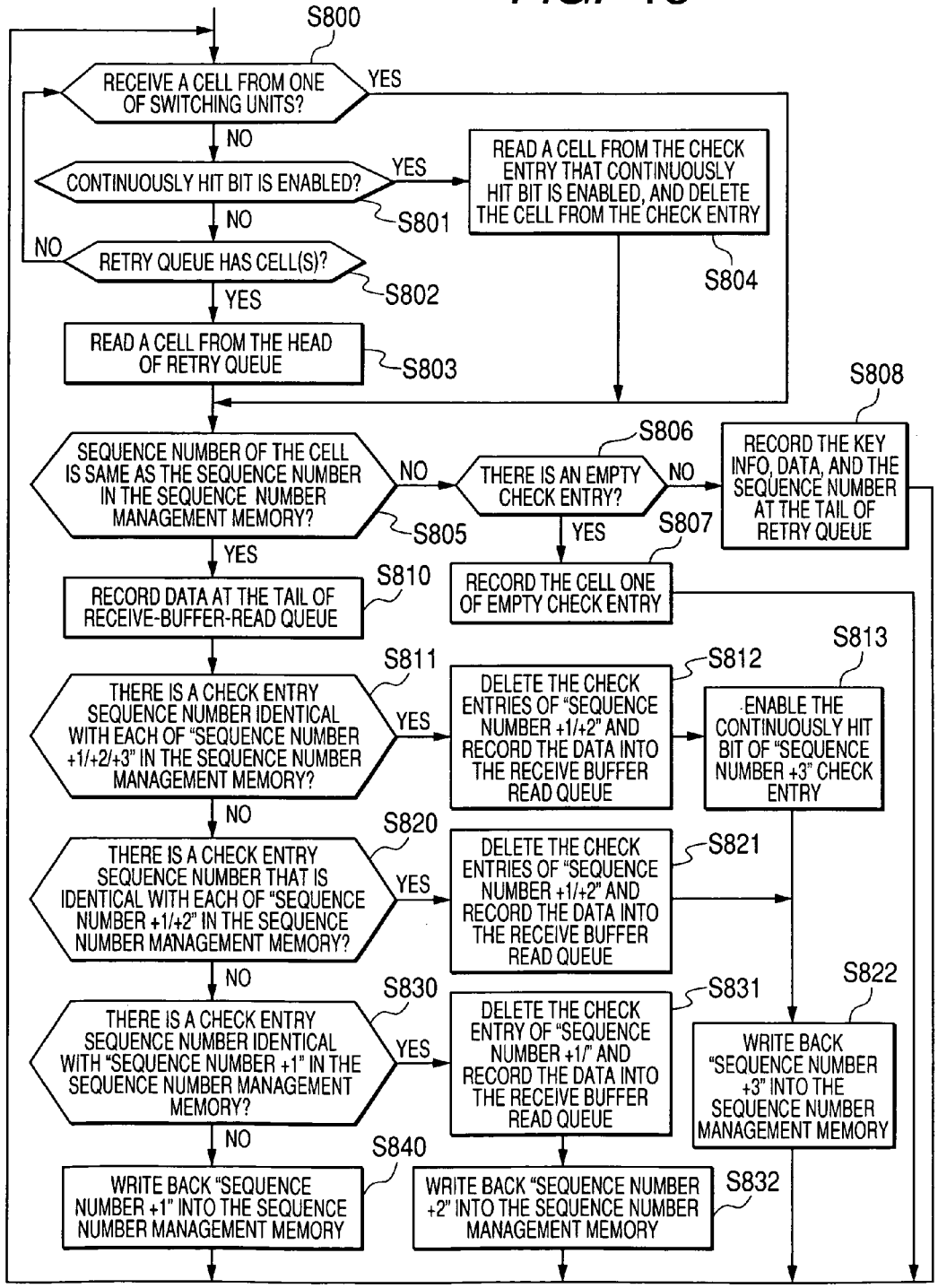
FIG. 16 is a flowchart of the flow reordering processings shown in FIG. 14 in the embodiment of the present invention.

Next, there will be described the operation of the flow reordering part 330' shown in FIG. 15 with reference to the flowchart shown in FIG. 16. In step S800, if the flow reordering part 330' inputs a cell from a switching unit 200 through the input 400, the flow reordering part 330' refers to the sequence number management memory 332 according to the key information set in the cell header and reads the sequence number of the current head cell of the flow.

Then, in the flow reordering part 330', the comparator 333 makes a comparison between the read sequence number and that of the inputted cell in step S805. If they are the same, the flow reordering part 330' records the cell data in the position of the sequence number +0 in the receive-buffer-read queue 335. After this, the flow reordering part 330' checks whether or not the sequence number held in the check entry 338 having the same cell and key information is the same as any of the "sequence number +1", "sequence number +2", and "sequence number +3" generated by the continuous sequence number generator 337.

If all of "sequence number +1", "sequence number +2", and "sequence number +3" are the same as the data in any of the check entries, the flow reordering part 330' records the "sequence number +1" check entry data in the position of "sequence number +1" of the receive-buffer-read queue 335. And the flow reordering part 330' records the "sequence number +2" check entry data in the position of "sequence number +2" of the receive-buffer-read queue 335. Then, the flow reordering part 330' deletes the data from the check entries of "sequence number +1" and the "sequence number +2" and enables the continuously hit bit in the check entry of "sequence number +3". The flow reordering part 330' also writes back "sequence number +3" in the sequence number management memory 332 as the number of the head cell of the subsequent cells in the flow. (Steps S811->S812->S813->S822)

If "sequence number +1" and "sequence number +2" are the same as the data in any check entry even when the condition in step S811 is not satisfied, the flow reordering part 330' records the "sequence number +1" check entry data in the position of "sequence number +1" in the receive-buffer-read queue 335. Then, the flow reordering part 330' records the "sequence number +2" check entry data in the position of "sequence number +2" in the receive-buffer-read queue 335. Then, the flow reordering part 330' deletes the data from the check entries of the "sequence number +1" and "sequence number +2" respectively. The flow reordering part 330' then writes back "sequence number +3" in the sequence number management memory 332 as the number of the head cell of the subsequent cells in the flow. (Steps S811->S820->S821->S822)

If "sequence number +1" is the same as the data in any check entry even when the condition in step S820 is not satisfied, the flow reordering part 330' records the "sequence number +1" check entry data in the position of "sequence number +1" in the receive-buffer-read queue 335. Then, the flow reordering part 330' deletes the data from the check entry of the "sequence number +1". The flow reordering part 330' then writes back "sequence number +2" in the sequence number management memory 332 as the number of the head cell of the subsequent cells in the flow. (Steps S811->S820->S830->S831->S832)

If the condition in step S830 is not satisfied, the flow reordering part 330' writes back "sequence number +1" in the sequence number management memory 332 as the number of the head cell of the subsequent cells in the, flow in step S840. (Steps S811->S820->S830->S840)

If the sequence numbers are not the same in step S805, the flow reordering part 330' checks whether or not an empty entry exists in any check entry 338 in step S806. If the check result is YES, the flow reordering part 330' records the key information, sequence number, and data of the cell in the empty entry.

In step S806, the flow reordering part 330' checks whether or not an empty entry exists in any of the check entries 338. If the check result is NO, the flow reordering part 330' records the key information, sequence number, and data of the cell in the retry queue 336.

In step S800, if the flow reordering part 330' inputs no cell from any switching unit through the input 400, the flow reordering part 330' checks the continuously hit bit in each of the check entries 338A to 338K. And if the continuously hit bit in any of those check entries 338A to 338K is enabled in step S804, the continuously hit selector 341 selects any one of the check entries having an enabled continuously hit bit, that is, any one of the continuously hit enabled check entries and inputs each of the information held in the selected check entry to the flow reordering part through the input 440 again, then deletes the data from the selected check entry.

The sequence number inputted from any of the check entries 338A to 338K is always the same as that in the sequence number management memory 332, since the continuously hit bit is enabled in the check entry. Thus the flow reordering part 330' executes the same processings as described above in step S805, as well as in and after step S810.

Furthermore, if the continuously hit bit in any of the check entries 338 is not enabled in step S801, the flow reordering part 330' checks whether or not an entry exists in the retry queue 336 in step S802.

If there is an entry in the retry queue 336, the flow reordering part 330' reads the head entry in the retry queue 336 in step S803 and checks whether or not the sequence number read through the input 420 is the same as that of the flow in the sequence number management memory 332 in step S805. Hereinafter, the flow reordering part 330' repeats the processings in and after step S806 or in and after step S810.

This completes the detailed description of the reordering unit capable of restoring the original order of cells in each flow in a shorter time than that 300 in the first embodiment with use of the check entries 338A to 338K. The logic resources of check entries, continuous sequence number generator 337, etc. increase significantly in proportion to their mounting amounts respectively. Thus it would be reasonable to use a dozen or so check entries and 3 to 4 more continuous sequence number generators 337. Insufficiency of check entries can be compensated by the retry queue 336 provided additionally. If the number of logic resources, even when it is increased significantly, is considered to be within a common range, it is possible to use many check entries 338 up to a certain extent instead of using the retry queue 336.

While the preferred forms of the present invention have been described in detail with respect to a reordering part of the multi-plane cell switch fabric system of the present invention, it is to be understood that modifications will be apparent to those skilled in the art without departing from the spirit of the invention.

The reordering method of the multi-plane cell switch fabric system according to the present invention can apply to any system required to exchange data through large capacity lines. For example, the method can apply to a switch fabric in a network system typically represented as a router, as well as a switch fabric, etc. in any of servers, storage units and devices, etc.

What is claimed is:

1. A multi-plane cell switch fabric system including a plurality of switching units used for asynchronous destination arbitration respectively;
   wherein said system includes a distribution unit that provides an input function and includes a mechanism that divides each variable-length packet addressed to a same destination into one or more fixed length cells, temporarily holds those cells addressed to said same destination until a quantity of those cells exceeds an integer multiple of a quantity of said switching units, then sends said cells to said plurality of switching units in units of a quantity of cells equal to said integer multiple of said quantity of said switching units;
   wherein each of said switching units in said switch fabric system includes a mechanism for arbitrating output of each cell among a plurality of destinations while keeping a sending order of said cells received from a same source; and
   wherein said system includes a reordering unit that provides an output function and said reordering unit includes:
   a mechanism for using ordering check information of each received cell to decide whether or not said cell is a head cell;
   a FIFO (First In First Out) queue for temporarily recording information used for said ordering check information only if said cell is not a head cell;
   a mechanism for selecting said cell if it is a head cell and further checking temporarily recorded information in said FIFO queue sequentially from a head entry of the FIFO queue, thereby selecting a next head cell of subsequent cells to the selected head cell; and
   a mechanism for using packet delimitation information to restore an original packet with respect to said selected head cell.

2. The multi-plane cell switch fabric system according to claim 1, wherein said reordering unit includes a plurality of mechanisms for making an ordering check of each received cell with respect to whether or not said received cell is a head cell respectively, a plurality of FIFO queues for temporarily recording each received cell decided not to be a head cell respectively, and a plurality of mechanisms for checking each received cell with respect to whether or not said received cell is a head cell of subsequent cells; and wherein said reordering unit further includes a mechanism for making a head cell check for the information in said FIFO queues sequentially from respective heads of said FIFO queues while no cell is received if any one of said FIFO queues has an entry.

3. A multi-plane cell switch fabric system including a plurality of switching units used for asynchronous destination arbitration respectively,
   wherein said system includes a distribution unit that provides an input function and includes a mechanism that divides each variable-length packet addressed to a same destination into one or more fixed length cells, temporarily holds those cells addressed to said same destination until a quantity of those cells exceeds an integer multiple of a quantity of said switching units, then sends said cells to said plurality of switching units in units of a quantity of cells equal to said integer multiple of the quantity of said switching units;
   wherein each of said switching units in said switch fabric system includes a mechanism for arbitrating output of each cell among a plurality of destinations while keeping a sending order of said cells received from a same source; and wherein said system includes a reordering unit that provides an output function and includes:
a mechanism for using ordering check information of each received cell to decide whether or not said cell is a head cell;
a temporary recording mechanism for temporarily recording said ordering check information only if said cell is not a head cell;
a mechanism for selecting said cell if said cell is a head cell and further checking temporarily recorded information in said temporary recording mechanism with respect to each cell not selected as the head cell, thereby selecting a next head cell of subsequent cells to the selected head cell; and
a mechanism for using packet delimitation information to restore an original packet with respect to said selected head cell.

4. The multi-plane cell switch fabric system according to claim 3, wherein said distribution unit further includes a mechanism that, in case of a multi-cast packet addressed to a plurality of destinations, divides said multi-cast packet into fixed length cells and sends those divided cells to said plurality of switching units even when the quantity of cells does not exceed said integer multiple of the quantity of said switching units.

5. The multi-plane cell switch fabric system according to claim 3, wherein said distribution unit further includes a mechanism that, where said temporarily held fixed length cells are not output even after a preset threshold time, sends those temporarily held cells to said plurality of switching units forcibly.

6. The multi-plane cell switch fabric system according to claim 3, wherein said ordering check information of each received cell consists of a source number, a flow number that indicates destination pattern, and a sequence number in said destination pattern.

7. The multi-plane cell switch fabric system according to claim 3, wherein said reordering unit further includes a FIFO queue for temporarily recording information of said non-head cell when said temporary recording mechanism is full of recorded information of non-head cells; and wherein said reordering unit checks recorded information in said FIFO queue to further select a next head cell of subsequent cells to the selected head cell in between checks of received cells and recorded information in said temporary recording mechanism.

8. The multi-plane cell switch fabric system according to claim 3, wherein said system includes a mechanism for enabling said distribution unit and each switching unit to manage a number of cells receivable in said switching unit and a number of cells receivable in said reordering unit as a credit respectively and to reduce the number of said credits by one at a time of each cell sending; and wherein said mechanism notifies said reordering unit and said switching unit of a generated empty area when a cell is sent from cell receive buffers of said switching unit and said reordering unit, thereby each of said reordering unit and said switching unit restores one credit.

9. The multi-plane cell switch fabric system according to claim 8, wherein each switching unit manages at least one credit for said reordering unit with respect to each source and manages a plurality of common credits with respect to each source.

10. A multi-plane cell switch fabric system comprising:
a plurality of switching units used for asynchronous destination arbitration respectively;
a distribution unit, that provides an input function, including a mechanism that divides each variable-length packet addressed to a same destination into one or more fixed length cells, temporarily holds those cells addressed to said same destination until a quantity of those cells exceeds an integer multiple of a quantity of said switching units, then sends said cells to said plurality of switching units in units of a quantity of cells equal to said integer multiple of said quantity of said switching units; and
a reordering unit including a plurality of mechanisms for making an ordering check for each received cell with respect to whether or not said received cell is a head cell respectively by using ordering check information of the each received cell, a plurality of temporary recording mechanisms for temporarily recording information used for said ordering check only if said cell is not a head cell, and a plurality of mechanisms for selecting said cell if it is a head cell and further checking temporarily recorded information in said temporary recording mechanism with respect to each cell not selected as the head cell, thereby selecting a next head cell of subsequent cells to the selected head cell;
wherein said reordering unit further includes a continuous hit selecting mechanism and, if a head cell is received while there are some cells in said temporary recording mechanism, said continuous hit selecting mechanism respectively checks a sequence number of every cell in said temporary recording mechanism to compare said sequence number with each value obtained by adding an integer value between 1 and a specific integer to the sequence number of the current selected head cell; and
wherein said continuous hit selecting mechanism selects cells having ordering check information recorded in said temporary recording mechanism when results of the comparison indicate that said cells have consecutive sequence numbers following the sequence number of the current head cell, then deleting the ordering check information of those cells from said temporary recording mechanism.

* * * * *